US008426511B2

(12) United States Patent
Nagao et al.

(10) Patent No.: US 8,426,511 B2
(45) Date of Patent: Apr. 23, 2013

(54) CATIONIC POLYURETHANE RESIN AQUEOUS DISPERSION, INK-JET RECEIVING AGENT INCLUDING THE SAME, AND INK-JET RECORDING MEDIUM USING THE SAME

(75) Inventors: Kenji Nagao, Nara (JP); Kazunori Tanaka, Izumi (JP); Masato Inoue, Izumi (JP); Masatoshi Matsuo, Izumiotsu (JP)

(73) Assignee: DIC Corporation, Tokyo (JP)

( * ) Notice: Subject to any disclaimer, the term of this patent is extended or adjusted under 35 U.S.C. 154(b) by 24 days.

(21) Appl. No.: 13/064,977

(22) Filed: Apr. 29, 2011

(65) Prior Publication Data
US 2011/0257322 A1 Oct. 20, 2011

Related U.S. Application Data

(62) Division of application No. 11/631,077, filed as application No. PCT/JP2005/011736 on Jun. 27, 2005, now Pat. No. 7,964,665.

(30) Foreign Application Priority Data

Jun. 29, 2004 (JP) ................................. 2004-191204
Oct. 29, 2004 (JP) ................................. 2004-315735

(51) Int. Cl.
*B05D 3/02* (2006.01)
*B41M 5/00* (2006.01)
*B41M 5/40* (2006.01)
*C08G 18/00* (2006.01)
*C08G 18/08* (2006.01)
*C08G 18/28* (2006.01)
*C08G 18/70* (2006.01)
*C08K 3/10* (2006.01)
*C08K 3/20* (2006.01)
*C08L 75/00* (2006.01)

(52) U.S. Cl.
USPC ..................... 524/436; 427/372.2; 427/385.5; 427/391; 428/32.1; 428/32.29; 428/32.28; 428/32.38; 524/589; 524/590; 524/591; 524/839; 524/840; 528/44; 528/66; 528/71; 528/85

(58) Field of Classification Search .................. 524/589, 524/590, 591, 839, 840, 436; 528/44, 66, 528/71, 85; 427/372.2, 385.5, 391; 428/32.1, 428/32.29, 32.28, 32.38
See application file for complete search history.

(56) References Cited

U.S. PATENT DOCUMENTS

| 3,804,786 | A | 4/1974 | Sekmakas |
| 3,891,527 | A | 6/1975 | Sekmakas |
| 3,922,253 | A | 11/1975 | Jerabek et al. |
| 5,569,707 | A | 10/1996 | Blum et al. |
| 6,046,295 | A | 4/2000 | Frisch, Jr. et al. |
| 6,773,771 | B1 | 8/2004 | Ashida et al. |
| 2003/0103129 | A1 | 6/2003 | Tanaka et al. |
| 2003/0124079 | A1 | 7/2003 | Mougin et al. |

FOREIGN PATENT DOCUMENTS

| EP | 0541289 A1 | 5/1993 |
| JP | 58-219213 A | 12/1983 |
| JP | 02-276670 A | 11/1990 |
| JP | 04-209674 A | 7/1992 |
| JP | 05-320331 A | 12/1993 |
| JP | 2000-309157 A | 11/2000 |
| JP | 2002-105161 A | 4/2002 |
| JP | 2002-307812 A | 10/2002 |
| JP | 2002-317116 A | 10/2002 |
| JP | 2003-055176 A | 2/2003 |
| JP | 2003-080826 A | 3/2003 |
| JP | 2004-155069 A | 6/2004 |

OTHER PUBLICATIONS

Supplementary European Search Report dated Nov. 2, 2009, issued on the corresponding European patent application No. 05 76 5155.6.
Notice of Allowance mailed Apr. 27, 2012, issued for the Korean Patent Application No. 10-2006-7023599 and English translation thereof.

*Primary Examiner* — Patrick Niland
(74) *Attorney, Agent, or Firm* — Edwards Wildman Palmer LLP; James E. Armstrong, IV; Nicholas J. DiCeglie, Jr.

(57) ABSTRACT

A cationic polyurethane resin aqueous dispersion wherein a cationic polyurethane resin (B) including a structural unit (A) represented by the following general formula (I) is dispersed in aqueous medium, and the content of a cationic amino group of the structural unit (A) in the cationic polyurethane resin (B) is 0.005 to 1.5 equivalents/kg.

(I)

$$-NHCO-CH-CH_2-O-R_1-O-CH_2-CH-O-CNH-$$
with $\|$ O, $CH_2$, $CH_2$, $\|$ O branches, and $R_2-N^+-R_3$ groups with $R_4$ and $X^-$ on each side.

(In the formula, $R_1$ represents an alkylene group which may include an alicyclic structure, a residue of bivalent phenol or polyoxyalkylene group, $R_2$ and $R_3$ each independently represents an alkyl group which may include an alicyclic structure, and $R_4$ represents a hydrogen atom or a residue of the quaternizing agent which is introduced by the quaternizing reaction, and $X^-$ represents an anionic counter ion.)

15 Claims, No Drawings

CATIONIC POLYURETHANE RESIN AQUEOUS DISPERSION, INK-JET RECEIVING AGENT INCLUDING THE SAME, AND INK-JET RECORDING MEDIUM USING THE SAME

TECHNICAL FIELD

The present invention relates to a cationic polyurethane resin aqueous dispersion excellent in waterproof characteristics, durability, adhesiveness and the like, which can be applied to various usages such as for heat-transfer media, heat-sensitive media, heat-sensitive stencil printing plate media, coatings, adhesives, cosmetics, plating, fibers, toiletries, medical articles, packing articles and the like, as well as for a glass sizing agent and a receiving agent for a recording material for ink-jet printing.

BACKGROUND ART

Conventionally, polyurethane resins have been used in various fields such as the coating industry, adhesives industry, leather-associated industry and the like, as resins which can be used in the boundary field between the rubber field and the plastics field, due to the excellent characteristics such as the mechanical property, wear resistance, chemical resistance, adhesiveness and the like of polyurethane resins.

Although mainstream polyurethane resins are an organic solvent-soluble type polyurethane resins, water-borne polyurethane resins which have water dispersing ability and can reduce a load on the environment and the human body caused by the usage of an organic solvent have been noted in recent years. In order to respond to the increasing social needs such as environmental protection, resource saving and safety, the use of an organic solvent-soluble type polyurethane resin has shifted rapidly to the use of a water-dispersion type polyurethane resin.

As a technology for dispersing a polyurethane resin, a method wherein a mechanical forced emulsion-distribution of a polyurethane resin into water is carried out, a method wherein an ionic group is introduced as a cation or anion into a polyurethane resin and is distributed in water, and the like are known. In terms of specific properties, the performance of the water-borne polyurethane resin is improved to a similar level of an organic solvent-soluble type polyurethane resin due to recent technical progress, and therefore, such a water-borne polyurethane resin has been practically used for various uses.

Among the water-borne polyurethane resins, a self-water-dispersible polyurethane resin to which ionic groups as a cation or anion are introduced has an advantage from the viewpoint of characteristics such that the polyurethane resin can be dispersed without adding strong shearing force, and dispersion stability of the resin in water is comparatively excellent. Particularly, a cationic polyurethane resin has been prevalent in various uses as a highly functional resin which has comparatively excellent corrosive resistance, adhesiveness to a substrate, waterproof characteristics, and the like.

For example, accompanied with market developments corresponding to engineering plastics such as FRP and FRTP, it is required to achieve high performance of a glass fiber which is used as a reinforcer of an engineering plastic. A water-borne polyurethane resin has been used for many years as a glass fiber sizing agent. In recent years, for the purpose of further increasing the sizing property of the glass fiber, the need for a cationic polyurethane resin excellent in adhesiveness with respect to glass fiber has increased.

Various trials have been performed in order to satisfy the aforementioned needs.

For example, a cationic polyurethane aqueous dispersion solution has been proposed which is obtained by using a compound having at least one epoxy group and at least one hydroxyl group in one molecule, polyol, diisocyanate, a chain-extending agent such as N-methyl diethanolamine, N-ethyl diethanolamine and a quaternizing agent. (For example, please refer to patent document 1.) The aforementioned document discloses that the cationic polyurethane aqueous dispersion solution is excellent in ordinary adhesion hardness, waterproof adhesion strength and flexibility, and when it is used as a sizing agent for a glass fiber, the dispersion can provide particularly excellent sizing property and reinforcing effect.

However, the aforementioned dispersion solution has a problem regarding storage stability such that large viscosity change of the dispersion solution arises with the passage of time, due to cohesion of polyurethane resin particles dispersed in water caused while the dispersion solution is preserved. Moreover, the dispersion solution has a practical problem in that the dispersion solution cannot satisfy the market requirement level of adhesiveness to an inorganic substrate such as a glass substrate.

Furthermore, a method for manufacturing a water-dispersible polyurethane is disclosed in which a prepolymer comprising an isocyanate group at the terminal end is prepared by reacting an excess amount of isocyanate with polyol and a cationic hydrophilic-generating agent, wherein the agent is obtained by changing a tertiary amino group of a tertiary amine such as N,N-dimethyl ethanolamine to a quaternary amino group by adding alkylene oxide under the presence of a strong acid such as methanesulfonic acid, and then said obtained prepolymer is dispersed in water to extend a chain formed from the prepolymer. (For example, please refer to patent document 2.)

However, the cationic polyurethane aqueous dispersion obtained as described above also has a problem regarding storage stability, since a large viscosity change arises with the passage of time due to the cohesion of polyurethane resin particles dispersed in water caused while the solution is preserved. Moreover, similar to the aforementioned solution, the aqueous dispersion has a practical problem in that it cannot satisfy the market requirement level of adhesiveness to an inorganic substrate such as a glass substrate.

On the other hand, in the ink-jet print industries which have been rapidly developed in recent years, an image quality formed by an ink-jet printer has remarkably improved and it is possible to obtain an image which is no less excellent than silver halide photos. In order to achieve a high fine image, it is necessary to use an ink-jet recording medium excellent in ink absorbing property, high color density, bleeding preventing property, gloss and the like.

Moreover, the ink-jet printer is used not only as a household printer but also for business uses such as signboards and advertisements. So-called wide-format ink-jet printers, which can conduct a large-size printing, are used for said business uses. Such types of printer eject excessively large amounts of ink as compared with household ink-jet printers. Therefore, an ink-jet recording medium usable for a wide-format ink-jet printer is required to achieve furthermore excellent high ink absorbing property as compared with the household printer. Furthermore, in many cases, the printed medium tends to be exposed to the outdoor for a long period of time. Accordingly, the medium is required to be excellent in waterproof characteristics, resistances to light and gases such as ozone, and also excellent in image preservation property.

As an improving means from the ink side, although dye has been conventionally used as a coloring material of an ink-jet ink, the employment of a method which uses a pigment ink instead of dye ink has been utilized in order to improve the image preservation property. Although the pigment ink was only used for the wide-format ink-jet printer for business use at first, the pigment ink has also been employed for some models of household ink-jet printer in recent years.

By the way, a water based ink is used for the ink-jet printer in general. Usually, an ink-jet recording medium includes a substrate such as paper and a plastic film and an ink-jet receiving layer provided thereon, wherein the layer is formed from an ink-jet receiving agent which is a water-soluble resin such as polyvinyl alcohol, polyvinyl pyrrolidone and the like and any of various additives, in order to prevent bleeding caused by a water based ink or improve ink absorbing property.

However, the ink-jet receiving layer which is popularly used at present is a layer developed for a dye ink which has been conventionally used. Therefore, when such an ink-jet receiving layer is used for a pigment ink, the employment of which has increased in recent years, problems are caused such that bleeding arises due to insufficient adsorption of the pigment ink into the ink-jet receiving layer, a homogenized image cannot obtained due to the occurrences of cracks which are formed in an image portion where the printed amounts of ink is large, and the like. In this way, such a receiving layer cannot be adapted to printing of a pigment ink.

Moreover, a water based ink is used for ink-jet printing in general as described above, and therefore, there is a problem that a printed image printed by the ink-jet printer has poor waterproof characteristics. Accordingly, various trials have been conducted in order to improve the poor waterproof characteristics.

The most popular method to improve the waterproof characteristics is a method wherein an ink-jet receiving agent is used which includes an aqueous cationic resin such as a poly(diallyldimethylammonium chloride) in addition to the aforementioned water soluble resin such as polyvinyl alcohol and polyvinyl pyrrolidone. In the method, waterproof characteristics can be improved by fixing of coloring material (dye and/or pigment) of a water based ink due to the electrostatic bonding between an anionic group included in the molecule of the coloring material (dye and pigment) in the ink and a cationic group in the molecule of the water-soluble cationic resin. Due to the method, the waterproof characteristics can be improved to some extent. However, since the water-soluble cationic resin itself tends to be easily dissolved in water, the effect of the method for improving waterproof characteristics was insufficient. Moreover, such an ink-jet receiving layer has poor printing property and cannot achieve a level usable for an ink-jet receiving layer for a pigment ink.

On the other hand, various ink-jet recording media which comprise an ink-jet receiving layer containing large amounts of porous inorganic fine particles, so-called micro porous type or a void type recording media, have been proposed as an ink-jet recording medium which can adsorb an ink quickly and is excellent in quick-drying capability. For example, a receiving sheet which includes an ink-jet receiving layer comprising a pseudo boehmite type alumina (for example, please refer to patent document 3), and an ink-jet receiving sheet, which is excellent in gloss and waterproof characteristics and includes an ink-jet receiving layer comprising a silica, aluminum compound produced by a fumed method and the like (for example, please refer to patent documents 4) have been proposed.

These ink-jet receiving layers have innumerable fine voids, and the fine voids enable the layer to be printed due to the adsorption of a solvent of an ink into the voids. However, there is a limit to the void quantities to be provided. Therefore, when printing is conducted with a printer, which ejects large amounts of ink, such as a wide-format ink-jet printer in which pigment inks are mainly used, a problem arises such that good quality printed materials cannot be obtained since fine voids of a receiving layer cannot adsorb all of the solvent of the ink and thus non-absorbed ink overflows therefrom.

Moreover, since such an ink-jet receiving layer contains large amounts of inorganic fine particles, fine cracks tend to be formed at the coated surface thereof, when an ink-jet receiving agent is coated on a substrate and dried. Accordingly, it is necessary for an ink-jet receiving layer to be dried at low temperature, and/or to conduct coating plural times in order to form an ink-jet receiving layer wherein each coating does not provide a thickness sufficient to allow cracks. Therefore, there was a problem in that manufacturing efficiency was remarkably poor.

As described above, there is great demand for the development of an ink-jet receiving agent which can achieve good manufacturing efficiency of an ink-jet recording medium, and can provide an ink-jet receiving layer which is excellent in printing ability and absorbing property with respect to a pigment ink, and which is excellent in waterproof characteristics of a printed image formed on the medium.

Patent document 1: Japanese Unexamined Patent Application, First Publication, No. 58-219213
Patent-document 2: Japanese Unexamined Patent Application, First Publication, No. 5-320331
Patent-document 3: Japanese Unexamined Patent Application, First Publication, No. 2-276670
Patent-document 4: Japanese Unexamined Patent Application, First Publication, No. 2000-309157

DISCLOSURE OF INVENTION

Problems to be Solved by the Invention

The purpose of the present invention is to provide a cationic polyurethane resin aqueous dispersion which has excellent dispersing property in water to achieve excellent storage stability for a long period of time, has excellent adhesiveness to various substrates, and provides excellent waterproof characteristics on a coating which is formed after removing water from the dispersion.

Moreover, another purpose of the present invention is to provide a cationic polyurethane resin aqueous dispersion which achieves excellent adhesiveness to glass fiber when it is used as a glass fiber sizing agent.

Further, another purpose of the present invention is to provide an ink-jet receiving agent which can provide an ink-jet receiving layer excellent in printing ability, and absorbing property with respect to a pigment ink and waterproof characteristics of printed images.

Means for Solving the Problems

In order to introduce a cationic hydrophilic group into a skeleton of a polyurethane resin, the inventors of the present invention studied the use of N-alkyl dialkanolamine typified by N-methyl diethanolamine, which has been conventionally used as described above, and combined this amine with various polyols and polyisocyanates, or a prepolymer which is a reaction product obtained therefrom. However, there was a limit to increasing the water dispersing property of the obtained cationic polyurethane resins, and the obtained final cationic polyurethane resin aqueous dispersions did not have improved storage stability.

Regarding the aforementioned problem, the present inventors supposed that the desired water dispersing property cannot be achieved since the polyurethane resin obtained using the aforementioned N-alkyl dialkanolamine was a resin wherein a nitrogen atom which constituted a tertiary amino group was introduced to the main chain of the polyurethane resin skeleton, and therefore, if said introduced tertiary amino group was intended to be neutralized by acid or quaternized by a quaternizing agent, a reaction of neutralization or quaternization was not able to proceed effectively, and therefore the improvement of the water dispersibility was not able to be achieved.

Moreover, the inventors supposed that, even if the quaternary amino group could be generated from a tertiary amino group or a salt obtained by neutralizing the tertiary amino group, when such a tertiary amino group or salt was introduced to a main chain of the polyurethane resin skeleton, the salt or quaternary amino group had a low degree of freedom due to the molecular structure thereof, and such a tertiary amino group or salt could not form an association structure with a water molecule, which was important for water dispersibility, and therefore the effect for improving water dispersibility was limited, and the polyurethane aqueous dispersion caused an increased viscosity due to aggregation of distributed fine particles which were generated with the passage of time.

Then, the present inventors continued their study based on the idea that it may be possible to form an association structure easily with a water molecule by arranging a nitrogen atom at the position branched from the main chain of the polyurethane resin as a base (hereinafter, the branched position may be referred as "side chain") and then forming a quaternary amino group or neutralization salt, rather than by forming the molecular structure wherein the nitrogen atom of the tertiary amino group was included in the main chain of the polyurethane resin, and thus advanced their study.

As a result of further study, the present inventors found that dispersibility in water was able to be achieved due to a polyurethane resin having a cationic group at the side chain thereof, the resin being obtained by introducing a tertiary amino group having a specific structure at the side chain of a polyurethane resin and then conducting the neutralization of the group by acid or quaternization by a quaternizing agent. The cationic polyurethane resin obtained as described above was confirmed to have excellent water dispersibility and viscosity stability as compared with conventional cationic polyurethane resin aqueous dispersions, since storage stability thereof was excellent and viscosity hardly changed even if the aqueous dispersion was allowed to stand for three months at 40° C.

Moreover, the present inventors found that very excellent waterproof characteristics can be achieved by using a polyurethane resin film obtained by drying subsequent to coating the aforementioned cationic polyurethane resin aqueous dispersion on a substrate such as a plastic film.

Furthermore, the present inventors found that excellent printing property with respect to a pigment ink, excellent adsorbing property and very excellent waterproof characteristics of a printed image can be achieved due to an ink-jet recording medium having an ink-jet receiving layer provided on a substrate, the medium being obtained by coating an ink-jet receiving agent comprising the aforementioned cationic polyurethane resin aqueous dispersion, a water-soluble resin, and a water-soluble polyvalent metallic salt on the substrate, and then volatilizing aqueous medium included in the agent.

That is, the present invention provides a cationic polyurethane resin aqueous dispersion wherein a cationic polyurethane resin (B) including a structural unit (A) represented by the following general formula (I) is dispersed in aqueous medium, and the content of a cationic amino group of the structural unit (A) in the cationic polyurethane resin (B) is 0.005 to 1.5 equivalents/kg.

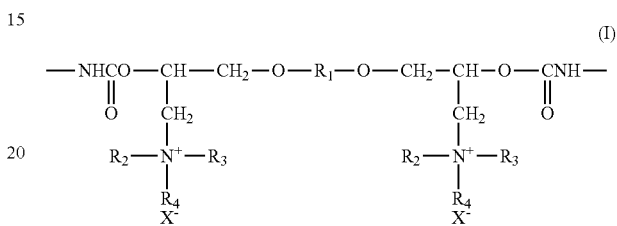

(In formula, $R_1$ represents an alkylene group which may include an alicyclic structure, a residue of bivalent phenol or a polyoxyalkylene group, $R_2$ and $R_3$ each independently represents an alkyl group which may include an alicyclic structure, and $R_4$ represents a hydrogen atom or a residue of a quaternizing agent which is introduced by a quaternizing reaction, and $X^-$ represents an anionic counter ion.)

Moreover, the present invention provides the aforementioned cationic polyurethane resin aqueous dispersion wherein the aforementioned cationic polyurethane resin (B) further includes a structural unit (C) represented by the following general formula (II).

(Here, in the general formula, $R_5$ represents a monovalent organic residue selected from the group consisting of a hydrogen atom, an alkyl group an aryl group and an aralkyl group, $R_6$ represents a functional group selected from the group consisting of a halogen atom, an alkoxyl group, an acyloxy group, a phenoxy group, an iminoxy group and an alkenyloxy group, and n represents an integer of 0, 1 or 2.)

The adhesiveness of the obtained cationic polyurethane resin aqueous dispersion to an inorganic substrate such as glass can be further improved, by introducing the structural unit (C) represented by the aforementioned general formula (II) into the aforementioned cationic polyurethane resin (B).

Moreover, the present invention provides an ink-jet receiving agent, which includes:
a cationic polyurethane resin (B) containing a structural unit (A) represented by the aforementioned general formula (I);
a water-soluble resin (H);
water-soluble polyvalent metallic salt (J); and
an aqueous medium into which said resins and salt are dispersed: and
the content of a cationic amino group of the structural unit (A) included in the cationic polyurethane resin (B) is 0.005 to 1.5 equivalents/kg.

Furthermore, the present invention provides an ink-jet recording medium wherein an ink-jet receiving layer is formed on a substrate, and the medium is obtained by coating or impregnating a substrate with or into the aforementioned ink-jet receiving agent and then volatilizing the aqueous medium.

Effect of the Invention

According to the present invention, a cationic polyurethane resin aqueous dispersion can be provided wherein the dispersion is excellent in: dispersibility in water; distribution stability even when maintained for a long period of time; and adhesiveness to various substrates; and it is possible to achieve excellent waterproof characteristics and durability of a film formed from the dispersion, the film being obtained after removing water.

Moreover, by using the aforementioned cationic polyurethane resin aqueous dispersion as a glass fiber sizing agent, glass fiber excellent in adhesiveness between glass fibers can be provided.

Furthermore, the present invention can provide an ink-jet receiving agent, wherein the aforementioned cationic polyurethane resin aqueous dispersion, a water-soluble resin, and a water-soluble polyvalent metallic salt are included, and excellent absorbing property and printing ability with respect to pigment ink can be achieved, and good waterproof characteristics of a printed image formed thereon can also be achieved.

Furthermore, due to the aforementioned excellent characteristics, the cationic polyurethane resin aqueous dispersion of the present invention can be used for various uses such as media for heat-transfer media, heat-sensitive media and heat-sensitive stencil printing plate media in addition to the media for ink-jet, and for coatings, adhesives, cosmetics, plating, fibers, toiletries, medical articles, packing articles and the like.

BEST MODE FOR CARRYING OUT THE INVENTION

The cationic polyurethane resin aqueous dispersion of the present invention includes: a cationic polyurethane resin (B) including a structural unit (A) represented by the following general formula (I) in a molecule, in which the resin is dispersed in aqueous medium; and the content of a cationic amino group of the structural unit (A) in the cationic polyurethane resin (B) is 0.005 to 1.5 equivalents/kg.

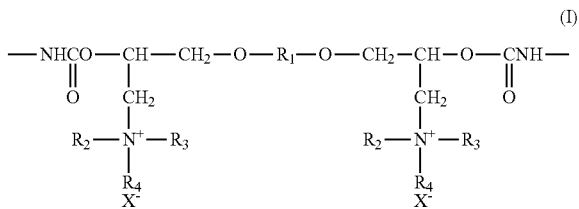

(In the formula, $R_1$ represents an alkylene group which may include an alicyclic structure, a residue of bivalent phenol or polyoxyalkylene group, $R_2$ and $R_3$ each independently represents an alkyl group which may include an alicyclic structure, and $R_4$ represents a hydrogen atom or a residue of a quaternizing agent which is introduced by a quaternizing reaction, and $X^-$ represents an anionic counter ion.)

Here, in the present invention, a "residue" is defined as a compound from which at least one element or a group is removed. As $R_1$, any group as the alkylene group which may include an alicyclic structure, residue of a bivalent phenol, and a polyoxyalkylene group may be selected if required, and those groups cited in $R_1$ of a compound (A-1) described below are preferable. Furthermore, any group as the alkylene group which may include an alicyclic structure may be selected if required, and this group may be a group included in a secondary amine (A-2) described below. For example, it is preferable that the alkylene group which may include an alicyclic structure is a propyl group, a butyl group or a pentyl group, and it is more preferable that the alkylene group is a butyl group. Although a residue of the quaternizing agent can be selected if required, it is preferable that the residue be a methyl group or an ethyl group. $X^-$ can be selected as required, and it is preferable that $X^-$ be an anionic counter ion which is formed when acetic acid, phosphoric acid, dibutyl sulfate, benzyl chloride and the like are used as an acid or a quaternizing agent.

The structural unit (A) represented by the aforementioned general formula (I) is a structural unit which is necessary for providing water dispersibility to the cationic polyurethane resin (B) which constitutes the present invention, and for improving waterproof characteristics of the polyurethane resin film, which is formed by using the cationic polyurethane resin aqueous dispersion of the present invention, fixing ability of an ink-jet ink, and waterproof characteristics of a printed image and adhesiveness to an inorganic substrate, especially to a glass substrate.

The cationic polyurethane resin (B) to which the aforementioned structural unit (A) is introduced into the polyurethane resin skeleton is explained below.

The cationic polyurethane resin (B) used in the present invention includes a structural unit (A) represented by general formula (I), and includes 0.005 to 1.5 equivalents/kg of cationic amino groups included in structural unit (A), preferably 0.01 to 1.0 equivalents/kg and more preferably 0.02 to 0.5 equivalents/kg. The cationic polyurethane resin (B) can be produced using conventional compounds. As a method for manufacturing the cationic polyurethane resin (B) from raw materials which are low price and industrially available easily, the most effective method is a method wherein polyisocyanate (G) described below is reacted with a tertiary amino group-containing polyol (E) which is obtained by reacting a secondary amine (A-2) and a compound (A-1) having two epoxy groups in one molecule represented by general formula (IV) shown below.

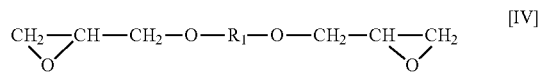

(In general formula, $R_1$ represents an alkylene group which may include an alicyclic structure, a residue of a bivalent phenol or a polyoxyalkylene group.)

The aforementioned tertiary amino group-containing polyol (E) is a compound used for introducing a cationic group as a quaternary amino group or a neutralization salt of a tertiary amino group, which is used for providing water dispersibility to the polyurethane resin, to a side chain of a polyurethane resin skeleton.

Said tertiary amino group-containing polyol (E) is a precursor which can provide a cationic group due to neutralization of the tertiary amino group contained in the molecule of the polyol (E) by acid or due to quaternization of the tertiary amino group contained in the molecule of the polyol (E) by the quaternizing agent.

The aforementioned tertiary amino group-containing polyol (E) can be easily obtained, for example, by blending a compound (A-1) which has two epoxy groups in one molecule and a secondary amine (A-2) so that one equivalent NH group exists per one equivalent of an epoxy group, and then conducting a ring-opening addition reaction without a catalyst under ordinary temperatures or while heating.

As compound (A-1) which has two epoxy groups in one molecule represented by aforementioned general formula (IV), a compound described below can be used singly or in combination of two or more.

Examples of compound (A-1) wherein said $R_1$ is the alkylene group which may include an alicyclic structure include: 1,2-ethanediol diglycidyl ether, 1,2-propanediol diglycidyl ether, 1,3-propanediol diglycidyl ether, 1,4-butanediol diglycidyl ether, 1,5-pentanediol diglycidyl ether, 3-methyl-1,5-pentanediol diglycidyl ether, neopentylglycol diglycidyl ether, 1,6-hexanediol diglycidyl ether, polybutadiene diglycidyl ether, 1,4-cyclohexane diglycidyl ether, diglycidyl ether of 2,2-bis(4-hydroxy cyclohexyl)-propane (hydrogenated bisphenol A), diglycidyl ether of an isomer mixture of hydrogenated dihydroxy diphenyl methane (hydrogenated bisphenol F).

Examples of compound (A-1) wherein $R_1$ is a residue of a bivalent phenol include: resorcinol diglycidyl ether, hydroquinone diglycidyl ether, diglycidyl ether of 2,2-bis(4-hydroxy cyclohexyl)-propane (bisphenol A), diglycidyl ether of an isomer mixture of dihydroxy diphenyl methane (bisphenol F), diglycidyl ether of 4,4-dihydroxy-3,3'-dimethyl diphenyl propane, diglycidyl ether of 4,4-dihydroxy diphenyl cyclohexane, diglycidyl ether of 4,4-dihydroxydiphenyl, diglycidyl ether of 4,4-dihydroxy dibenzophenone, diglycidyl ether of bis(4-hydroxy phenyl)-1,1-ethane, diglycidyl ether of bis(4-hydroxy phenyl)-1,1-isobutane, diglycidyl ether of bis(4-hydroxy-3-tertiarybutyl phenyl)-2,2-propane, diglycidyl ether of bis(2-hydroxy naphthyl)methane, diglycidyl ether of bis(4-hydroxyphenyl) sulfone (bisphenol S).

Moreover, examples of compound (A-1) wherein $R_1$ is a polyoxyalkylene group include: diethylene glycol diglycidyl ether, dipropylene glycol diglycidyl ether, polyoxy alkylene glycol diglycidyl ether wherein the number of repeating units of oxyalkylene is 3 to 60, such as polyoxyethylene glycol diglycidyl ether, polyoxypropylene glycol diglycidyl ether, diglycidyl ether of ethylene oxide-propylene oxide copolymer and poly oxytetraethylene glycol diglycidyl ether.

Among them, since water dispersibility of a cationic polyurethane resin can be further improved, it is preferable that the compound (A-1) be diglycidyl ether of polyoxyalkylene glycol, wherein $R_1$ of the aforementioned general formula (IV) is a polyoxyalkylene group, and is more preferable that the compound be polyoxyethylene glycol diglycidyl ether, and/or polyoxypropylene glycol diglycidyl ether and/or diglycidyl ether of ethylene oxide-propylene oxide copolymer.

From the viewpoints of suppressing the influence on the various physical properties such as mechanical property, heat property and the like of the cationic polyurethane resin aqueous dispersion of the present invention to the minimum degree, and of making it possible to control the cationic concentration of the cationic polyurethane resin aqueous dispersion widely, the epoxy equivalent of the diglycidyl ether of polyoxyalkylene glycol, wherein $R_1$ of the aforementioned general formula (IV) is a polyoxyalkylene group, is preferably included in the following scope. That is, the epoxy equivalent is preferably 1000 g/equivalent or less, more preferably 500 g/equivalent or less, and particularly preferably 300 g/equivalent or less. Although the lower limit is not limited in particular in the present invention, it is preferable that the epoxy equivalent be 80 g/equivalent or more.

In the present invention, it is necessary to use a secondary amine (A-2) in order to manufacture the tertiary amino group-containing polyol (E) by a ring opening additional reaction using compound (A-1) which has two epoxy groups in one molecule.

As the aforementioned secondary amine (A-2), well-known compounds can be used, and a branched or straight chain aliphatic secondary amine is preferably used from the viewpoint of ease of the reaction control. Examples of the secondary amine include: dimethylamine, diethylamine, di-n-propylamine, diisopropylamine, di-n-butylamine, di-tert-butylamine, di-sec-butylamine, di-n-pentylamine, di-n-peptylamine, di-n-octyl amine, diisooctylamine, dinonylamine, diisononylamine, di-n-decylamine, di-n-undecylamine, di-n-dodecylamine, di-n-pentadecylamine, di-n-octadecylamine, di-n-nonadecylamine and di-n-eicosylamine.

Among them, an aliphatic secondary amine having 2 to 18 carbons is preferable, and an aliphatic secondary amine having 3 to 8 carbons is more preferable, since it is hardly volatilized at the time of manufacturing the tertiary amino group-containing polyol (E) and/or it is possible to reduce steric hindrance when a part of, or all parts of, the tertiary amino groups are neutralized by acid or are quaternized using a quaternizing agent.

Due to the quaternization or neutralization conducted by using a quaternizing agent or acid for a part of or all of the tertiary amino groups included in the tertiary amino group-containing polyol (E), water dispersibility can be provided to the cationic polyurethane resin (B) which is obtained by a reaction between the tertiary amino group-containing polyol (E) and the polyisocyanate (G).

Examples of the acid usable for neutralizing a part of or all of the aforementioned tertiary amino groups include: organic acids such as formic acid, acetic acid, propionic acid, succinic acid, glutaric acid, butyric acid, lactic acid, malic acid, citric acid, tartaric acid, malonic acid and adipic acid; organic sulfonic acids such as sulfonic acid, paratoluene sulfonic acid and methanesulfonic acid; inorganic acids such as hydrochloric acid, sulfuric acid, nitric acid, phosphoric acid, boric acid, phosphorous acid and fluoric acid. These acids may be used singly or in combination of two or more.

Moreover, examples of the quaternizing agent which can be used for quaternizing a part of or all of the aforementioned tertiary amino groups include: dialkyl sulfates such as dimethyl sulfate and diethyl sulfate; halogenated alkyl groups such as methyl chloride, ethyl chloride, benzyl chloride, methyl bromide, ethyl bromide, benzyl bromide, methyl iodide, ethyl iodide and benzyl iodide; methyl alkyl or aryl sulfonates such as methyl methanesulfonate and methyl paratoluensulfonate; epoxy groups such as ethylene oxide, propylene oxide, butylene oxide, styrene oxide, epichlorohydrin, allyl glycidyl ether, butyl glycidyl ether, 2-ethyl hexyl glycidyl ether and phenyl glycidyl ether. These compounds may be used singly or in combination of two or more.

In the present invention, there is no limitation regarding the amounts of the acid and the quaternizing agent used for neutralization or the quaternization of the tertiary amino group in particular. In order to achieve excellent storage stability of the cationic polyurethane resin aqueous dispersion of the present invention, it is preferable that the amounts thereof be in the range of 0.1 to 3 equivalents per one equivalent of a tertiary amino group, and more preferably in the range of 0.3 to 2.0 equivalents.

When a cationic polyurethane resin (B) of the present invention is compared with, for example, a conventional cationic polyurethane resin obtained by a conventional method such as those described above on the condition that the cation concentrations thereof are the same, the cationic polyurethane resin (B) shows more excellent self-water dispersibility than the conventional resin. The viscosity of the cationic polyurethane resin aqueous dispersion obtained from the resin (B) does not change with the passage of time even if the cationic polyurethane resin aqueous dispersion is preserved for a long period of time, and storage stability thereof is excellent.

The mechanism which provides the aforementioned effects is supposed as described below. That is, it is well known that urethane bonds included in a polyurethane resin form a pseudo-crystal structure with each other using a hydrogen bond or the like. As compared with a case wherein a neutralization salt of a tertiary amino group or the quaternary amino group exists at a main chain of a polyurethane resin skeleton as in the aforementioned conventional method, a neutralization salt of a tertiary amino group or a quaternary amino group which exists at side chains of the cationic polyurethane resin (B) is hardly influenced by steric hindrance, and therefore, the degree of freedom is large. For this reason, it is supposed that the group and salt can easily form an association structure with a water monomolecular which is important for obtaining water dispersibility.

A reaction method between compound (A-1) which has two epoxy groups per one molecule and a secondary amine (A-2) for obtaining the tertiary amino group-containing polyol (E) is explained below.

A reaction ratio (NH group/epoxy group) of an epoxy group included in compound (A-1) which has two epoxy groups per one molecule to an NH group included in the secondary amine (A-2) is preferably 0.5/1 to 1.1/1 based on an equivalent ratio, and more preferably 0.9/1 to 1/1 based on an equivalent ratio.

The aforementioned reaction can also be performed under non-solvent conditions. It is also possible to conduct a reaction using an organic solvent in order to control a reaction easily, to reduce stiffing load by lowering viscosity or to react uniformly.

Any organic solvent can be used insofar as the organic solvent inhibits the reaction. Examples of the organic solvent include: ketones, ethers, acetates, hydrocarbons, chlorinated hydrocarbons, amides and nitriles.

Examples of the ketones include: acetone, diethyl ketone, methyl ethyl ketone, methyl isobutyl ketone. Examples of the ethers include: diethyl ether, ethylene glycol dimethyl ether, ethylene glycol diethyl ether, ethylene glycol dibutyl ether, tetrahydrofuran and dioxane.

Examples of the acetates include: ethyl acetate, butyl acetate and propyl acetate. Examples of the hydrocarbons include: n-pentane, n-hexane, cyclohexane, n-heptane, benzene, toluene and xylene. Examples of the chlorinated hydrocarbons include: carbon tetrachloride, dichloromethane, chloroform and trichloroethane. Examples of the amides include: dimethyl formamid, and examples of the nitriles include N-methylpyrolidone and acetonitrile.

Among the aforementioned organic solvents, when an organic solvent having a low boiling point is used, it is possible to conduct a pressure-added reaction under sealed conditions in order to prevent diffusion of the organic solvent due to volatilization.

It is possible to conduct a reaction of compound (A-1) having two epoxy groups per one molecule and the secondary amine (A-2) such that both of compound (A-1) and the secondary amine (A-2) are supplied at once in a reaction vessel to conduct a reaction; or one of compound (A-1) having two epoxy groups per one molecule and the secondary amine (A-2) is supplied in a reaction vessel in advance and then the other one is added to the reaction vessel drop-wise.

Since the reaction between compound (A-1) having two epoxy groups per one molecule and the secondary amine (A-2) shows high reactivity, it is not necessary to use a catalyst in general. However, in such a case in which a substituent such as an aliphatic group bonding to a nitrogen atom of the secondary amine (A-2) is large and therefore a reaction with the aforementioned compound (A-1) becomes slow by steric hindrance, it is possible to use a catalyst such as a proton supplying substance such as those represented by alcohols, water, phenol and acetic acid.

It is preferable that the reaction temperature be in the range of room temperature to 160° C., and more preferably in the range of 60 to 120° C. Although the reaction time is not limited in particular, the reaction time is generally in the range of 30 minutes to 14 hours. The end point of the reaction can be recognized by the infrared spectroscopy (the IR method), since the absorption peak originated from an epoxy group which is in a vicinity of 842 cm$^{-1}$ disappears due to the end of the reaction.

Furthermore, amine equivalent (g/equivalent) and a hydroxyl equivalent (g/equivalent) can be calculated by a conventional method.

When the aforementioned cationic polyurethane resin (B) is manufactured, in addition to the aforementioned tertiary amino group-containing polyol (E), any of various kinds of polyols (F) which have been used for manufacturing of polyurethane in general can be used in accordance with the required purpose and use.

Preferable examples of the polyols include: various polyols which have preferably the number average molecular weight in the range of 200 to 10,000, and more preferably 300 to 5000, such as polyester polyol, polyether polyol, polycarbonate polyol manufactured by the esterification between carbonic acid and aliphatic polyhydric alcohol, polyesteramide polyol, polyacetal polyol, polythioether polyol and polybutadiene glycol polyol. These polyols can be used singly or in combination of two or more.

Hereinafter, typical compounds of polyester polyol, polyether polyol and polycarbonate polyol, which are the aforementioned polyol (F) and are industrially available easily, are exemplified.

As the aforementioned polyester polyol, a compound which is obtained by conducting the esterification between a low-molecular-weight polyol and polycarboxylic acid can be used.

Examples of the low-molecular-weight polyol include: ethylene glycol, propylene glycol, 1,3-propanediol, 1,3-butanediol, 1,4-butanediol, 1,5-pentanediol, 3-methyl-1,5-pentanediol, 1,6-hexanediol, neopentyl glycol, diethylene glycol, triethylene glycol, tetraethylene glycol, dipropylene glycol, tripropylene glycol, 1,4-cyclohexane diol, 1,4-cyclohexane dimethanol, polyethylene glycol (the number average molecular weight is in the range of 300 to 6000), polypropylene glycol (the number average molecular weight is in the range of 300 to 6000), copolymer of ethylene oxide and propylene oxide (the number average molecular weight is in the range of 300 to 6000); bisphenol A, hydrogenated bisphenol A and alkylene oxide adducts of said bisphenol A; and trimethylol propane, trimethylol ethane, pentaerythritol and sorbitol.

Examples of polycarboxylic acid which can be used for manufacturing the aforementioned polyester polyol include:

succinic acid, adipic acid, azelaic acid, sebacic acid, dodecane dicarboxylic acid, maleic anhydride, fumaric acid, 1,3-cyclopentane dicarboxylic acid, 1,4-cyclohexane dicarboxylic acid, terephthalic acid, isophthalic acid, phthalic acid, 1,4-naphthalene dicarboxylic acid, 2,6-naphthalene dicarboxylic acid, naphthalic acid, biphenyl dicarboxylic acid, 1,2-bis(phenoxy)ethane-p,p'-dicarboxylic acid, trimellitic acid, pyromellitic acid, and anhydrides or ester derivatives of the polycarboxylic acids.

Moreover, as the aforementioned polyester polyol, polyester which is obtained by a ring-opening polymerization of a cyclic ester compound such as ε-caprolactone and copolymerized polyesters which are obtained from the polyesters can be used.

Moreover, examples of the polyether polyol include compounds which are obtained by an addition polymerization of one or more kinds of compounds such as ethylene oxide, propylene oxide, butylene oxide, styrene oxide, epichlorohydrin, tetrahydrofuran and cyclohexylene, wherein the reaction is conducted using a compound having at least two active hydrogen atoms described below as an initiator.

Examples of the compound having at least two active hydrogen atoms include: ethylene glycol, diethylene glycol, triethylene glycol, propylene glycol, 1,3-propanediol, 1,3-butanediol, 1,4-butanediol, hexamethylene glycol, saccharose, methylene glycol, glycerol, sorbitol; aconitic acid, trimellitic acid, hemimellitic acid, phosphoric acid, ethylenediamine, propylene diamine, diethylene triamine, triisopropanol amine, pyrogallol, dihydrobenzoic acid, a hydroxyphthalic acid and 1,2,3-propane trithiol.

Furthermore, examples of the polycarbonate polyol which can be manufactured by the esterification between carbonic acid and aliphatic polyhydric alcohol include: reaction products obtained between diols such as 1,3-propanediol, 1,4-butanediol, 1,6-hexanediol, diethylene glycol, polyethylene glycol, polypropylene glycol and poly tetramethylene glycol (PTMG) and dialkyl carbonates represented by dimethyl carbonate or cyclic carbonates represented by ethylene carbonate.

When the cationic polyurethane resin aqueous dispersion of the present invention is used as a receiving agent of a recording material used for ink-jet recording, weather resistance and light resistance are required as well as the aforementioned waterproof characteristics of the polyurethane resin film and fixing ability and waterproof characteristics of ink-jet ink, since the receiving material is provided outdoors when it is used for advertisement banners or the like. Furthermore, long-term durability is required when the recording material is used for printing materials such as photographs and pictures.

In such a case, it is desirable that polyol having high durability be used as the polyol (F). Therefore, it is preferable that a structural unit originated from the aforementioned polycarbonate polyol be introduced into a cationic polyurethane resin (B) by using polycarbonate polyol which is manufactured by the esterification between carbonic acid and aliphatic polyhydric alcohol.

Examples of the polyisocyanate (G) which can be used for manufacturing the cationic polyurethane resin (B) of the present invention include: well-known organic polyisocyanates which are commonly usable for manufacturing a waterborne polyurethane resin, such as aromatic polyisocyanates, alicyclic polyisocyanates and aliphatic polyisocyanates.

Examples of the aromatic polyisocyanates include: 1,3- and 1,4-phenylene diisocyanate, 1-methyl-2,4-phenylene diisocyanate (2,4-TDI), 1-methyl-2,6-phenylene diisocyanate (2,6-TDI), 1-methyl-2,5-phenylene diisocyanate, 1-methyl-2,6-phenylene diisocyanate, 1-methyl-3,5-phenylene diisocyanate, 1-ethyl-2,4-phenylene diisocyanate, 1-isopropyl-2,4-phenylene diisocyanate, 1,3-dimethyl-2,4-phenylene diisocyanate, 1,3-dimethyl-4,6-phenylene diisocyanate, 1,4-dimethyl-2,5-phenylene diisocyanate and diethylbenzene diisocyanate,
diisopropylbenzene diisocyanate, 1-methyl-3,5-diethylbenzene diisocyanate, 3-methyl-1,5-diethylbenzene-2,4-diisocyanate, 1,3,5-triethylbenzene-2,4-diisocyanate, naphthalene-1,4-diisocyanate, naphthalene-1,5-diisocyanate, 1-methyl-naphthalene-1,5-diisocyanate, naphthalene-2,6-diisocyanate, naphthalene-2,7-diisocyanate, 1,1-dinaphthyl-2,2'-diisocyanate, biphenyl-2,4'-diisocyanate, biphenyl-4,4'-diisocyanate, 3,3'-dimethylbiphenyl-4,4'-diisocyanate, diphenylmethane-4,4'-diisocyanate (4,4-MDI), diphenylmethane-2,2'-diisocyanate (2,2-MDI) and diphenylmethane-2,4-diisocyanate (2,4-MDI).

Examples of the alicyclic polyisocyanates and the aliphatic polyisocyanates include: tetramethylene diisocyanate, 1,6-hexamethylene diisocyanate (HDI), dodecamethylene diisocyanate, trimethyl hexamethylene diisocyanate, 1,3-cyclopentylene diisocyanate, 1,3-cyclohexylene diisocyanate, 1,4-cyclohexylen diisocyanate, 1,3-di(isocyanate methyl) cyclohexane, 1,4-di(isocyanate methyl)cyclohexane, lysine diisocyanate, Isophorone diisocyanate (IPDI), 4,4'-dicyclohexylmethane diisocyanate (4,4 H-MDI), 2,4'-dicyclohexylmethane diisocyanate (2,4-H-MDI), 2,2'-dicyclohexylmethane diisocyanate (2,2-H-MDI), 3,3'-dimethyl-4,4'-dicyclohexylmethane diisocyanate and trimers thereof.

From the viewpoint of being comparatively inexpensive and ease of obtaining raw materials thereof, it is preferable to use XDIs such as 1-methyl-2,4-phenylene diisocyanate (2,4-TDI), 1-methyl-2,6-phenylene diisocyanate (2,6-TDI), 1,3-dimethyl-2,4-phenylene diisocyanate, 1,3-dimethyl-4,6-phenylene diisocyanate and 1,4-dimethyl-2,5-phenylene diisocyanate, diphenylmethane-4,4'-diisocyanate (4,4-MDI), diphenylmethane-2,2'-diisocyanate (2,2-MDI), diphenylmethane-2,4-diisocyanate (2,4-MDI), 1,6-hexamethylene diisocyanate (HDI), isophorone diisocyanate (IPDI), 4,4'-dicyclohexylmethane diisocyanate (4,4-H-MDI), 2,4'-dicyclohexylmethane diisocyanate (2,4-H-MDI) and 2,2'-dicyclohexylmethane diisocyanate (2,2-HDI).

Furthermore, when the cationic polyurethane resin aqueous dispersion of the present invention is used as a receiving agent for a recording material used for ink-jet recording, in addition to waterproof characteristics of the polyurethane resin film, fixing ability and waterproof characteristics of ink-jet ink, weather resistance and light resistance are also required. The reason is that the receiving material is provided outdoors when it is used for advertisement banners or the like. Furthermore, long-term durability is required when the recording material is used for printing materials such as photographs and pictures.

In such a case in which the cationic polyurethane resin aqueous dispersion of the present invention is used as described above, in order to prevent deterioration of the surface appearance due to discoloration caused in addition to heat-proof or light-proof, it is preferable that alicyclic polyisocyanate and/or aliphatic polyisocyanates, which are non-yellowing type polyisocyanates in general, be used to introduce structural units originated from the aforementioned alicyclic polyisocyanate and/or aliphatic polyisocyanate into the cationic polyurethane resin (B).

Moreover, as the aforementioned polyisocyanate (G), 1,6-hexamethylene diisocyanate (HDI), isophorone diisocyanate (IPDI), 4,4'-dicyclohexylmethane diisocyanate (4,4-H-MDI), 2,4'-dicyclohexylmethane diisocyanate (2,4-H-MDI)

and 2,2'-dicyclohexylmethane diisocyanate (2,2-HDI) can be used desirably, when the ease of obtaining raw materials is taken into consideration.

Furthermore, as described above, the cationic polyurethane resin aqueous dispersion of the present invention can be suitably used as a sizing agent for glass fiber. In such a case, it is preferable that a structural unit (C) represented by the following general formula (II) be introduced into the skeleton of the cationic polyurethane resin (B) in order to achieve further excellent adhesiveness to an inorganic substrate, especially to a glass substrate.

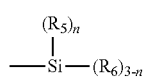

[II]

(In formula, $R_5$ represents a monovalent organic residue selected from the group consisting of a hydrogen atom, an alkyl group, an aryl group and an aralkyl group, $R_6$ represents a functional group selected from the group consisting of a halogen atom, an alkoxyl group, an acyloxy group, a phenoxy group, an iminooxy group and an alkenyloxy group, and n represents an integer of 0, 1 or 2.)

As a compound for introducing the aforementioned structural unit (C) into the cationic polyurethane resin (B), a compound (D) represented by the following general formula (III) is preferable.

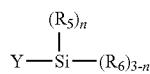

[III]

(In formula, $R_5$ represents a monovalent organic residue selected from the group consisting of a hydrogen atom, an alkyl group, an aryl group and an aralkyl group, $R_6$ represents a functional group selected from the group consisting of a halogen atom, an alkoxyl group, an acyloxy group, a phenoxy group, an iminooxy group and an alkenyloxy group, n represents the integer of 0, 1 or 2, and Y represents an organic residue which has at least one amino group.)

Examples of a compound which can be used as the compound represented by general formula (III) include: γ-(2-aminoethyl)aminopropyl trimethoxysilane, γ-(2-hydroxyethyl)aminopropyl trimethoxysilane, γ-(2-aminoethyl) aminopropyl triethoxysilane, γ-(2-hydroxyethyl) aminopropyl triethoxysilane, γ-(2-aminoethyl)aminopropyl methyldimethoxy aminopropyl methyl dimethoxysilane, γ-(2-aminoethyl)aminopropyl methyl diethoxysilane, γ-(2-hydroxyethyl)aminopropyl methyl dimethoxysilane, γ-(2-hydroxyethyl)aminopropyl methyldiethoxysilane or γ-(N,N-di-2-hydroxyethyl)aminopropyl triethoxysilane, γ-aminopropyl trimethoxysilane, γ-aminopropyl triethoxysilane, γ-aminopropyl methyl dimethoxysilane, γ-aminopropyl methydiethoxysilane, γ-(N-phenyl)aminopropyl trimethoxysilane, γ-mercaptopropyl trimethoxysilane and γ-mercaptophenyl trimethoxysilane.

When the cationic polyurethane resin (B) is manufactured, it is possible to use a polyamine as a chain-extension agent in order to design a polyurethane resin that achieves the required physical properties such as various mechanical properties and heat characteristics.

Examples of the polyamine which can be used as the aforementioned chain extension agent include: diamines such as ethylene diamine, 1,2-propane diamine, 1,6-hexamethylene diamine, piperazine, 2,5-dimethyl piperazine, isophorone diamine, 4,4'-dicyclohexylmethane diamine, 3,3'-dimethyl-4,4'-dicyclohexylmethane diamine and 1,4-cyclohexane diamine; diamines which have one primary amino group and one secondary amino group, such as hydroxymethyl aminoethyl amine, hydroxyethyl aminoethyl amine, hydroxypropyl aminopropyl amine, ethylamino ethyl amine and methyl amino propyl amine;

polyamines such as diethylene triamine, dipropylene triamine and triethylene tetramine; hydrazines such as hydrazine, N,N'-dimethyl hydrazine, 1,6-hexamethylene bishydrazine; dihydrazides such as succinic dihydrazide, adipic dihydrazide, glutaric dihydrazide, sebacic dihydrazide and isophthalic dihydrazide; semicarbazides such as β-semicarbazide propionic hydrazide, 3-semicarbazide-propyl-carbazate, semicarbazide-3-semicarbazide methyl-3,5,5-trimethyl cyclohexane.

When the cationic polyurethane resin (B) is manufactured, other than the aforementioned polyamine, other chain extension agents having an active hydrogen atom can be used in order to control various physical properties of the polyurethane resin such as mechanical properties and heat characteristics.

Examples of the aforementioned extension agent having an active hydrogen atom include: glycols such as ethylene glycol, diethylene glycol, triethylene glycol, propylene glycol, 1,3-propanediol, 1,3-butanediol, 1,4-butanediol, hexamethylene glycol, saccharose, methylene glycol, glycerol and sorbitol; phenols such as bisphenol A, 4,4'-dihydroxy diphenyl, 4,4'-dihydroxydiphenyl ether, 4,4'-dihydroxydiphenyl sulfone, hydrogenated bisphenol A, and hydroquinol; and water. These compounds can be used singly or in combination of two or more, insofar as the storage stability of the cationic polyurethane resin aqueous dispersion of the present invention does not deteriorate.

As methods for manufacturing the cationic polyurethane resin (B) used in the present invention and the cationic polyurethane resin aqueous dispersion in which said cationic polyurethane resin (B) is dispersed in water, the following methods can be cited, for example.

(Method 1)

A method which includes: adding polyol (F), polyisocyanate (G), tertiary amino group-containing polyol (E) and a compound (D) into a vessel all at once or divisionally number of times, reacting them under the presence of a solvent or non-solvent to manufacture a polyurethane resin, neutralizing and/or quaternizing a part of or all of the tertiary amino group included in the manufactured polyurethane resin using an acid or quaternizing agent, and adding water to the vessel to provide a water dispersion of the obtained resin.

(Method 2)

A method which includes: adding polyol (F), polyisocyanate (G), tertiary amino group-containing polyol (E) and a compound (D) into a vessel all at once or divisionally number of times, reacting them under the presence of a solvent or non-solvent to manufacture a urethane prepolymer having an isocyanate group at terminal ends, forming and extending a polymer chain using polyamine and the prepolymer to manufacture a polyurethane resin, neutralizing and/or quaternizing a part of or all of the tertiary amino group included in the manufactured polyurethane resin using an acid or quaternizing agent, and adding water to the vessel to provide a water dispersion of the obtained resin.

(Method 3)

A method which includes: adding polyol (F), polyisocyanate (G), tertiary amino group-containing polyol (E) and a compound (D) into a vessel all at once or divisionally number of times, reacting them under the presence of a solvent or non-solvent to manufacture a urethane prepolymer having an isocyanate group at terminal ends, neutralizing and/or quaternizing a part of or all of the tertiary amino group included in the manufactured polyurethane prepolymer using an acid or quaternizing agent, adding water to the vessel to provide a water dispersion of the prepolymer, and then forming and extending a polymer chain using polyamine and the neutralized and/or quaternized prepolymer.
(Method 4)

A method which includes: adding polyol (F), polyisocyanate (G), tertiary amino group-containing polyol (E) and a compound (D) into a vessel all at once or divisionally number of times, reacting them under the presence of a solvent or non-solvent to manufacture a urethane prepolymer having an isocyanate group at terminal ends, neutralizing and/or quaternizing a part of or all of the tertiary amino group included in the manufactured polyurethane prepolymer using an acid or quaternizing agent, dispersing or dissolving the prepolymer in an aqueous medium by conducting emulsification by the force of machines such as a homogenizer, and then forming and extending a polymer chain using a polyamine and the prepolymer.
(Method 5)

A method which includes: adding polyol (F), polyisocyanate (G), tertiary amino group-containing polyol (E), a compound (D) and polyamine into a vessel all at once, reacting them under the presence of a solvent or non-solvent to manufacture a polyurethane resin, neutralizing and/or quaternizing a part of or all of the tertiary amino group included in the manufactured polyurethane resin using an acid or quaternizing agent, and adding water into the vessel to disperse or dissolve the polyurethane resin in water.
(Method 6)

A method which includes: adding polyol (F), polyisocyanate (G) and tertiary amino group-containing polyol (E) into a vessel all at once or divisionally number of times, reacting them under the presence of a solvent or non-solvent to manufacture a polyurethane resin, neutralizing and/or quaternizing a part of or all of the tertiary amino group included in the manufactured polyurethane resin using an acid or quaternizing agent, and then adding water into the vessel to disperse the polyurethane resin in water.
(Method 7)

A method which includes: adding polyol (F), polyisocyanate (G) and tertiary amino group-containing polyol (E) into a vessel a part of or all at once or divisionally number of times, reacting them under the presence of a solvent or non-solvent to manufacture a urethane prepolymer having an isocyanate group at terminal ends, forming and extending a polymer chain from the prepolymer using a polyamine to manufacture a polyurethane resin, neutralizing and/or quaternizing a part of or all of the tertiary amino group included in the manufactured polyurethane resin using an acid or quaternizing agent, and adding water into the vessel to disperse the polyurethane resin in water.
(Method 8)

A method which includes: adding polyol (F), polyisocyanate (G) and tertiary amino group-containing polyol (E) into a vessel all at once or divisionally number of times, reacting them under the presence of a solvent or non-solvent to manufacture a urethane prepolymer having an isocyanate group at terminal ends, neutralizing and/or quaternizing a part of or all of the tertiary amino group included in the prepolymer using an acid or quaternizing agent, adding water into the vessel to disperse the polyurethane resin in water, and then forming and extending a polymer chain from the prepolymer using a polyamine to manufacture a polyurethane resin.
(Method 9)

A method which includes: adding polyol (F), polyisocyanate (G) and tertiary amino group-containing polyol (E) into a vessel all at once or divisionally number of times into a vessel, reacting them under the presence of a solvent or non-solvent to manufacture urethane prepolymer having an isocyanate group at terminal ends, neutralizing and/or quaternizing a part of or all of the tertiary amino group included in the prepolymer using an acid or quaternizing agent, dispersing the prepolymer in an aqueous medium by conducting emulsification by the force of machines such as a homogenizer, and then forming and extending a polymer chain from the prepolymer using a polyamine.
(Method 10)

A method which includes: adding polyol (F), polyisocyanate (G), tertiary amino group-containing polyol (E) and polyamine into a vessel all at once and reacting them under the presence of a solvent or non-solvent to manufacture a polyurethane resin, neutralizing and/or quaternizing a part of or all of the tertiary amino group included in the resin using an acid or quaternizing agent, and dispersing the resin by adding water thereto.

In the aforementioned methods 1 to 10, an emulsifier can be used as required.

There is no limitation to an emulsifier which can be used for the present invention. From the viewpoint that the excellent storage stability of the aforementioned cationic polyurethane resin aqueous dispersion can be maintained, it is preferable that the emulsifier be a nonionic or cationic emulsifier. Examples of the emulsifier include: nonionic emulsifiers such as polyoxyethylene nonylphenyl ether, polyoxyethylene lauryl ether, polyoxyethylene styrylphenyl ether, polyoxyethylene sorbitol tetraoleate, and a copolymer of polyoxyethylene and polyoxypropylene; and cationic emulsifiers such as alkylamine salt, alkyl trimethyl ammonium salt and alkyl dimethyl benzyl ammonium salt. Furthermore, as long as the mixing stability of emulsifiers with respect to the aforementioned cationic polyurethane resin aqueous dispersion is maintained, an anionic and/or amphoteric emulsifier can be used in addition to the aforementioned emulsifiers.

When the cationic polyurethane resin (B) is manufactured by the aforementioned method, a compound having a group which can become a hydrophilic group (hereinafter, the compound is referred to as a compound having a hydrophilic group) can be used as an assistant which aids the water-dispersibility of the resin.

Examples of the aforementioned compound having a hydrophilic group include a compound having an anionic group, a compound having a cationic group, a compound having an anionic group and a cationic group and a compound having a nonionic group. From the viewpoint of maintaining excellent storage stability of the cationic polyurethane resin aqueous dispersion, the compound having a nonionic group is preferably used.

As the compound having a nonionic group, a compound can be used which has at least one active hydrogen atom and has at least one functional group which is selected from the group consisting of a group which comprises repeat units of ethylene oxide and a group which comprises repeat units of ethylene oxide and repeat units of other alkylene oxide.

Examples of the compound having a nonionic group include: polyoxyethylene glycol, copolymer glycol of polyoxyethylene and polyoxypropylene, copolymer glycol of polyoxybutylene and polyoxyethylene, copolymer glycol of polyoxyalkylene and polyoxyethylene, a compound containing a nonionic group such as monoalkyl ether of the aforementioned glycols, and polyester polyether polyol obtained by the copolymerization of the aforementioned glycols and/or compounds, wherein the aforementioned copolymers and compounds have at least one active hydrogen atom in a polymer, have the number average molecular weights of 300 to 20,000 and include at least 30% by mass of repeat units of ethylene oxide.

Next, the raw material ratio (equivalence ratio) for manufacturing the cationic polyurethane resin (B) is described below in detail.

When the polyol (F), the tertiary amino group-containing polyol (E) and the polyisocyanate (G) are reacted with each other, it is preferable that the equivalence ratio of an isocyanate group and an active hydrogen atom-containing group, that is (equivalent of isocyanate groups contained in the (G))/(equivalent of hydroxyl groups contained in the (F)+equivalent of hydroxyl groups contained in the (E)), be controlled in the range of 0.9/1 to 1.1/1.

When the cationic polyurethane resin (B) is manufactured using a chain extension agent, for example using a polyamine, it is preferable that the equivalence ratio of an isocyanate group and an active hydrogen atom-containing group, that is (equivalent of isocyanate groups contained in the (G))/(equivalent of hydroxyl groups contained in the (F)+equivalent of hydroxyl groups contained in the (E)+equivalent of amino groups contained in the polyamine), be controlled in the range of 0.9/1 to 1.1/1.

Moreover, the cationic polyurethane resin (B) may be manufactured such that a chain extension reaction is conducted using a polyamine subsequent to manufacture of the urethane prepolymer. In such a case, it is preferable that the equivalence ratio of an isocyanate group and an active hydrogen atom-containing group, that is (equivalent of isocyanate groups contained in the (G))/(equivalent of hydroxyl groups contained in the (F)+equivalent of hydroxyl groups contained in the (E)), be in the range of 1.1/1 to 3/1, and more preferable 1.2/1 to 2/1. In such case, it is preferable that equivalent ratio of amino groups contained in the polyamine which is used for the chain extension and excess isocyanate groups be controlled in the range of 1.1/1 to 0.9/1.

Moreover, when the polyol (F), the tertiary amino group-containing polyol (E), the compound (D) and the polyisocyanate (G) are reacted with each other, it is preferable that the equivalence ratio of an isocyanate group and an active hydrogen atom-containing group, that is (equivalent of isocyanate groups contained in the (G))/(equivalent of hydroxyl groups contained in the (F)+equivalent of hydroxyl groups contained in the (E)+equivalent of amino groups contained in the (D)), be controlled in the range of 0.9/1 to 1.1/1.

For example, when polyamine is used as a chain extension agent for manufacturing the cationic polyurethane resin (B), it is preferable that the equivalence ratio of an isocyanate group and an active hydrogen atom-containing group, that is (equivalent of isocyanate groups contained in the (G))/(equivalent of hydroxyl groups contained in the (F)+equivalent of hydroxyl groups contained in the (E)+equivalent of amino groups contained in the (D)+equivalent of amino groups contained in the polyamine), be controlled in the range of 0.9/1 to 1.1/1.

Moreover, the aforementioned cationic polyurethane resin (B) may be manufactured by a chain extension reaction using a polyamine subsequent to manufacture of the urethane prepolymer. In such a case, it is preferable that the equivalence ratio of an isocyanate group and an active hydrogen atom-containing group, that is (equivalent of isocyanate groups contained in the (G))/(equivalent of hydroxyl groups contained in the (F)+equivalent of hydroxyl groups contained in the (E)+equivalent of amino groups contained in the (D)), be in the range of 1.1/1 to 3/1, and more preferably 1.2/1 to 2/1.

In such a case, it is preferable that equivalent ratio of amino groups contained in the polyamine which is used for the chain extension and excess isocyanate groups be in the range of 1.1/1 to 0.9/1.

In the aforementioned reaction, the range of reaction temperature is preferably in the range of 20 to 120° C., and more preferably in the range of 30 to 100° C.

Furthermore, for the purpose of achieving excellent storage stability, the tertiary amino group-containing polyol (E) is preferably used in the range of 0.005 to 1.5 equivalents/kg, more preferably 0.03 to 1.0 equivalence/kg and the most preferably 0.15 to 0.5 equivalences/kg, based on the total amounts of the tertiary amino group-containing polyol (E), the polyol (F), polyisocyanate (G), the compound (D) and the polyamine.

Moreover, for the purpose of achieving excellent adhesiveness to an inorganic substrate, the compound (D) is preferably used in the range of 0.1 to 20% by mass, and more preferably 0.5 to 10% by mass, based on the total amounts of the polyol (F), polyisocyanate (G) and the polyamine.

Although the aforementioned cationic polyurethane resin (B) can be manufactured under non-solvent conditions, it is possible to manufacture it under the conditions wherein an organic solvent is included for the purpose of controlling the reaction easily, reducing stirring load due to lowering viscosity and/or mixing uniformly.

Examples of the organic solvent include: ketones such as acetone, diethyl ketone, methyl ethyl ketone and methyl isobutyl ketone; ethers such as diethyl ether, ethylene glycol dimethyl ether, ethylene glycol diethyl ether, ethylene glycol dibutyl ether, tetrahydrofuran and dioxane; ester acetates such as ethyl acetate, butyl acetate and propyl acetate; nitriles such as acetonitrile; hydrocarbons such as n-pentane, n-hexane, cyclohexane, n-heptane, benzene, toluene and xylene; chlorinated hydrocarbons such as carbon tetrachloride, dichloromethane, chloroform, and trichloroethane; and amides such as dimethyl formamide and N-methylpyrrolidone.

Although the aforementioned cationic polyurethane resin (B) can be manufactured without a catalyst, it is possible to manufacture it using a well-known catalyst such as stannum compounds such as stannous octanoate, dibutyltin dilaurate, dibutyltin dimaleate, dibutyltin diphthalate, dibutyltin dimethoxide, dibutyltin diacetylacetate and dibutyltin diversatate, titanate compounds such as tetrabutyl titanate, tetraisopropyl titanate, and triethanolamine titanate, and tertiary amines and quarternary ammonium salts.

It is preferable that an organic solvent contained in the cationic polyurethane resin aqueous dispersion obtained as described above be removed in the middle of or subsequent to the reaction as required by any method such as heating conducted under reduced pressure.

Furthermore, the cationic polyurethane resin aqueous dispersion of the present invention may include additives such as a lubricant insofar as the purpose of the present invention is not inhibited. Examples of the lubricant include well-known cationic lubricants such as condensates which are obtained from straight-chain fatty acid and polyamine such as condensate of pelargonic acid and triethylenetetramine.

Furthermore, the cationic polyurethane resin aqueous dispersion of the present invention can include assistants such as antistatic agents such as sulfonate, allyl sulfate or alkyl sulfonate of triethanol amine, insofar as the purpose of the present invention is not inhibited.

The cationic polyurethane resin aqueous dispersion of the present invention can include various conventionally used additives insofar as the purpose of the present invention is not inhibited. Examples of the additives usable in the dispersion include: pigment, dye, film forming aid, curing agent, antiblocking agent, viscosity adjusting agent, pH adjusting agent, leveling agent, defoaming agent, antigelling agent, dispersion stabilizer, light stabilizer, antioxidant, ultraviolet absorbent, radical scavenger, thermal resistance imparting agent, inorganic filler, organic filler, plasticizer, reinforcing agent, catalyst, antibacteria agent, fungicide, anticorrosion agent, rust-inhibitor, a stabilizer for hydrolysable silyl group (stabilizer for preventing a hydrolysis and crosslinking of silyl of the hydrolysable silyl group), colloidal silica and colloidal alumina.

The cationic polyurethane resin aqueous dispersion of the present invention can be used by mixing with other well-known aqueous dispersion and/or water-soluble resins such as cellulose and POVAL, insofar as the purpose of the present invention is not inhibited. Examples of the well-known aqueous dispersion include: emulsions such as those of vinyl acetate aqueous dispersions, ethylene-vinyl acetate aqueous dispersions, acrylic aqueous dispersions, epoxy aqueous dispersions, polyester aqueous dispersions and polyamide aqueous dispersions; latexes such as those of styrene-butadiene resins, acrylonitrile-butadiene resins and acrylic-butadiene resins.

Next, the ink-jet receiving agent of the present invention is explained below.

The ink-jet receiving agent of the present invention is an agent to which the cationic polyurethane resin aqueous dispersion of the present invention is applied to. Specifically, the ink-jet receiving agent of the present invention includes: an aqueous medium, and a cationic polyurethane resin (B) which contains the structural unit (A) represented by the aforementioned general formula (I) in a molecule, a water-soluble resin (H) and water-soluble polyvalent metallic salt (J), which are dispersed in the aqueous medium; and the contents of the cationic amino group contained in the structural unit (A) in the cationic polyurethane resin (B) is 0.005 to 1.5 equivalents/kg.

The ink-jet receiving agent of the present invention can be obtained by mixing the aforementioned cationic polyurethane resin aqueous dispersion, the water-soluble resin (H) and the water-soluble polyvalent metallic salt (J), and other components as required.

Examples of the aqueous medium included in the ink-jet receiving agent of the present invention include water and an organic solvent which can be mixed with water. Examples of the organic solvent which can be mixed with water include: alcohols such as methanol, ethanol, n-propanol and isopropanol; ketones such as acetone and methyl ethyl ketone; polyalkylene glycols such as ethylene glycol, diethylene glycol and propylene glycol; alkyl ethers of polyalkylene glycol; lactams such as N-methyl-2-pyrrolidone. In the present invention, it is possible to use water alone, an organic solvent which can be mixed with water alone, or a mixture of water and the organic solvent which can be mixed with water as the aqueous medium. From the viewpoint of safety and load on the environment, water alone or the mixture of water and the organic solvent which can be mixed with water is preferable, and water alone is particularly preferable.

Next, the water-soluble resin (H) is described below.

The water-soluble resin means a resin which can be completely dissolved in water. Specific examples thereof include: polyvinyl alcohol, polyvinyl pyrrolidone, polyvinyl acetal, polyalkylene oxide, starch, cellulose derivatives such as methyl cellulose, hydroxy cellulose, hydroxypropyl cellulose, hydroxypropylmethyl cellulose and carboxymethyl cellulose, polyethylene imine, polyamide, various kinds of a water-soluble resin containing a quaternary ammonium salt group, and derivatives thereof.

Among them, polyvinyl alcohol, polyvinyl pyrrolidone, polyvinyl acetal, polyalkylene oxide, and cellulose derivatives are preferable since they are excellent in ink absorbing property.

Among them, polyvinyl alcohol is particularly preferable, since polyvinyl alcohol has physical properties required for an ink-jet receiving agent such as transparency, film strength and binding strength with respect to a pigment, and is readily available, and furthermore there are many kinds of polyvinyl alcohol such as modified polyvinyl alcohol. When the polyvinyl alcohol is used as the aforementioned water-soluble resin (H), it is possible to obtain an ink-jet receiving layer excellent in gloss, transparency and ink absorbing property.

Generally, polyvinyl alcohol can be obtained such that the "acetyl group" portion of vinyl acetate polymer is hydrolyzed by a strong base such as sodium hydroxide to form a hydroxyl group (saponification). As a commercially available polyvinyl alcohol, there are various polyvinyl alcohols having different saponification degree (the degree of saponification) and polymerization degree. According to required physical properties, a suitable polyvinyl alcohol which has the suitable degree of saponification degree polymerization degree can be used.

The saponification degree of polyvinyl alcohol is preferably 80 to 100% from the viewpoint of solubility of polyvinyl alcohol to water and ink absorbing property when it is used in an ink-jet receiving agent. When the saponification degree is 95% or more, it is more preferable since excellent pigment ink absorbing property can be achieved. Furthermore, when the saponification degree is 99% or more, it is particularly preferable since excellent coloring optical density of an image printed with a pigment ink can be achieved.

Moreover, from the viewpoint of waterproof characteristics of a printed image, it is preferable that the saponification degree be 95% or more since the waterproof characteristics of a printed image can be improved, more preferably 98% or more, and most preferably 99% or more.

Although any polymerization degree of the polyvinyl alcohol can be applicable, higher degree of polymerization is preferable since better absorbing property of pigment ink, better coloring optical density of a printed image and better waterproof characteristics can be achieved. Specifically, a polymerization degree of 1500 or more is preferable, and 3500 or more is still more preferable.

Moreover, modified polyvinyl alcohol in which any of various kinds of group for modification may be introduced can be used as the polyvinyl alcohol. Examples of the group for modification include; an acetoacetyl group, silyl group, a quarternary ammonium salt group, a carboxylic acid group, a carboxylate group, a sulfonic acid group, a sulfonate group, a ketone group, a mercapto group, an amino group and an ethylene group.

These polyvinyl alcohols can be obtained such that polyvinyl alcohol is reacted with a group for modification, or saponification of vinyl acetate copolymer is conducted wherein the vinyl acetate copolymer is obtained by copolymerization with copolymerizable monomers when polymerization of vinyl acetate polymer which is a precursor of polyvinyl alcohol is conducted.

Among such modified polyvinyl alcohols, polyvinyl alcohol modified with the acetoacetyl group or silyl group is preferable since excellent absorbing property regarding a pigment ink and excellent waterproof of a printed image can be achieved.

It is more preferable that the water-soluble resin (H) included in the ink-jet receiving agent of the present invention be a mixture of polyvinyl alcohol and polyvinyl pyrrolidone. Some ink-jet recording media have a problem particularly regarding a phenomenon called as "post-cure" wherein printing property of a dye ink deteriorates with the passage of time. This phenomenon arises by the deterioration of the absorbing property of the ink-jet receiving agent by which deterioration is caused due to the influence of heat and/or humidity. The reason for the phenomenon is supposed to be because the ink-jet receiving layer is crystallized due to hydrogen bond or the like. The combined use of polyvinyl alcohol and polyvinyl pyrrolidone is preferable since the degree of post-cure is improved, and therefore the ink-jet receiving agent of the present invention can be used for a dye ink as well as a pigment ink.

Polyvinyl pyrrolidone is a water-soluble resin which is obtained generally by the polymerization of N-vinyl pyrrolidone. It is possible to obtain commercial polyvinyl pyrrolidones having various molecular weights, such as "Luvitec K" series manufactured by BASF Corporation and "PVP K" series manufactured by ISP Investment, Incorporated (ISP Co., Inc.; USA). The weight average molecular weight of the polyvinyl pyrrolidone is preferably 100,000 to 2,000,000 from the viewpoint of ink absorbing property and ease of the handling which is achieved by appropriate viscosity thereof.

Furthermore, it is possible to use any of various kinds of modified polyvinyl pyrrolidones which can be obtained by a copolymerization between N-vinyl pyrrolidone and various kinds of monomers which can be copolymerized with the N-vinyl pyrrolidone. It is possible to manufacture various kinds of modified polyvinyl pyrrolidones and use them for the present invention. Furthermore, examples of a commercially available product of the pyrrolidone include: "LUVITEC VA64", which is a copolymer of N-vinyl pyrrolidone and vinyl acetate manufactured by BASF Corporation; "LUVITEC VPI55K72W", which is a copolymer of N-vinyl pyrrolidone and vinyl imidazole manufactured by BASF Corporation; "LUVITEC VPC55K65W", which is a copolymer of N-vinyl pyrrolidone and vinyl caprolactam manufactured by BASF Corporation; "VIVIPRINT121" and "VIVIPRINT131" manufactured by ISP Co., Inc., which are obtained by neutralizing the tertiary amino group portion of a copolymer of N-vinyl pyrrolidone and N,N-dimethyl amino propyl methacrylamide by using an acid; and "GAFQUAT 755N" manufactured by ISP Co., Inc., which is obtained by quaternizing the tertiary amino group portion of a copolymer of N-vinyl pyrrolidone and N,N-dimethyl amino ethyl methacrylate by using diethyl sulfate.

Among these modified polyvinyl pyrrolidones, it is preferable to use those comprising a tertiary amine salt (for example, the aforementioned "VIVIPRINT121" and "VIVIPRINT131"). When the aforementioned modified polyvinyl pyrrolidone containing the tertiary amine salt is used, it is possible to obtain an ink-jet receiving agent which can form an ink-jet receiving layer excellent in ink absorbing property and waterproof characteristics regarding an image printed thereon.

In addition, as long as the effects of the present invention do not deteriorate, polyvinyl pyrrolidone may be partially intramolecularly crosslinked.

It is still more preferable that a mixture of modified polyvinyl pyrrolidone containing tertiary amine salt and polyvinyl alcohol wherein the degree of saponification thereof is 95% or more be used as the water-soluble resin (H). When the aforementioned mixture is used as the water-soluble resin (H), it is possible to obtain an ink-jet receiving agent which can form an ink-jet receiving layer excellent in absorbing property of a pigment-ink, absorbing property of a dye-ink and waterproof characteristics regarding an image printed thereon.

It is particularly preferable that a mixture of modified polyvinyl pyrrolidone containing the tertiary amine salt and polyvinyl alcohol wherein the degree of saponification thereof is 99% or more be used as the water-soluble resin (H). When the aforementioned mixture is used as the water-soluble resin (H), it is possible to obtain an ink-jet receiving agent which can form an ink-jet receiving layer excellent in absorbing property of a pigment ink, absorbing property of a dye-ink and waterproof characteristics regarding an image printed thereon, and which can improve the coloring optical density of a printed image.

Next, the aforementioned water-soluble polyvalent metallic salt (J) is described below.

Here, the water-soluble polyvalent metallic salt is polyvalent metallic salt which has the solubility in water, and for example, it means a salt wherein, when a saturated aqueous solution of the polyvalent metallic salt is prepared using water of 20° C., 1 g or more of the polyvalent metallic salt can be included in 100 g of the saturated aqueous solution. Examples of the water-soluble polyvalent metallic salt (J) include bivalent metal salts such as magnesium salt, calcium salt, barium salt, iron (II) salt, copper (II) salt and zinc salt, and trivalent metal salts such as aluminium salt and chromium salt.

The following effects can be achieved due to the use of the water-soluble polyvalent metallic salt (J) in the ink-jet receiving agent of the present invention.

First, the effect of increasing absorbing property regarding a pigment ink can be obtained. Absorbing property regarding a pigment ink can be particularly improved at the image portion where the quantity of printed ink is large.

Secondly, the effect for improving waterproof characteristics of a printed image can be achieved. It is supposed that the waterproof characteristics of a printed image can be improved, since the water-soluble polyvalent metallic salt includes a metal ion which is a polyvalent cation, the cation can bond with an anion group included in a molecule of pigment and/or dye which is a coloring material included in an ink, and therefore solubility and/or dispersibility of the coloring material of a printed image in water can be reduced.

Thirdly, the effect of preventing the bleeding of an ink at the time of printing can be achieved. It is supposed that bleeding of an ink can be prevented since a metal ion included in a water-soluble polyvalent metallic salt can bond with a coloring material included in an ink as described above, and therefore migration in a horizontal direction of an ink sprayed onto to an ink-jet recording medium can be inhibited.

Fourthly, the effect of reducing the aforementioned post-cure can be achieved. It is supposed that post-cure, which is a phenomenon originated from a hydrogen bond, can be reduced, since various kinds of salts show the effect of preventing the occurrence of a hydrogen bond in general.

Among water-soluble polyvalent metallic salts, water-soluble magnesium salt is preferable from the viewpoint of high effects of increasing absorbing property regarding a pigment ink and of reducing the degree of post-cure. Examples thereof include; magnesium chloride, magnesium acetate, magnesium nitrate, magnesium sulfate and magnesium chlorate. These compounds may be used singly or in combination of two or more.

Among the water-soluble magnesium salts, magnesium chloride is particularly preferable from the viewpoint of excellent water-solubility in water, attractive price and availability thereof, in addition to the aforementioned four effects.

The preferable mixing ratio of the cationic polyurethane resin (B), the water-soluble resin (H) and the water-soluble polyvalent metallic salt (J), which are essential components of the ink-jet receiving agent of the present invention, is such that the content of the (B) is 5 to 69% by mass, the content of (H) is 30 to 94% by mass and the content of (J) is 1 to 30% by mass, based on the total amounts of the (B), (H) and (J). The ink-jet receiving layer, which is formed from the ink-jet receiving agent of the present invention and satisfies the aforementioned ratio, can show excellent ink-adsorbing ability and waterproof characteristics of an image printed thereon. When the mixing ratio of the cationic polyurethane resin (B) is in the range wherein (B) is 10 to 49% by mass, (H) is 50 to 89% by mass and (J) is 1 to 10% by mass, further excellent balance of the ink-adsorbing ability and the waterproof characteristics of an image printed thereon can achieved.

In the ink-jet receiving agent of the present invention, the ratio of the water medium to the solid content thereof (that is, the cationic polyurethane resin (B), the water-soluble resin (H), and the water-soluble polyvalent metallic salt (J)) is not limited. However, it is necessary to determine the ratio in consideration of the viscosity and storage stability of an ink-jet receiving agent. In general, when a water-soluble resin is dissolved in an aqueous medium, the viscosity of the medium rises exponentially in accordance with the concentration of the water-soluble resin. Moreover, there is a tendency that higher the concentration of the water-soluble resin, the poorer the storage stability. Accordingly, although it may depend on the kind of the water-soluble resin to be used, it is preferable that the ratio of the aqueous medium and the solid content of the receiving agent be controlled such that the viscosity of an ink-jet receiving agent is 100,000 mPa·s or less. Furthermore, it is required that the viscosity of an ink-jet receiving agent is controlled such that the viscosity is suitable for a coating device and impregnation processing device which are used when the ink-jet receiving agent of the present invention is coated or impregnated on or into various substrates.

Furthermore, the ink-jet receiving agent of the present invention can further include an additive, insofar as the effects of the present invention are not inhibited. Examples of the additive include various kinds of surfactants such as a nonionic surfactant, a cationic surfactant, an anionic surfactant, and an amphoteric surfactant; a dispersing agent for pigment; various kinds of leveling agents such as a silicone-containing leveling agent, a fluorine-containing leveling agent and an acetylene diol based leveling agent; antiblocking agents such as colloidal silica, colloidal alumina, inorganic pigments and resin beads; an ultraviolet absorbing agent, an antioxidant and an antistatic agent.

Although the amounts of additive are not limited insofar as the effects of the present invention do not inhibited, it is preferable that the amounts thereof be 0.01 to 5% by mass based on the total amounts of the solid contents included in the ink-jet receiving agent.

The ink-jet receiving agent of the present invention may include any of various kinds of porous pigments such as silica, clay, alumina, and calcium carbonate. It is preferable that silica and/or alumina be used as the porous pigments, since they are excellent in ink absorbing property, are commercially available easily and have excellent compatibility with the cationic polyurethane resin (B), which is a constitutive component of the present invention.

The aforementioned porous pigment is preferably used in the range of 10 to 90% by mass based on the total amounts of the solid contents of the ink-jet receiving agent.

The ink-jet receiving agent of the present invention may contain a well-known resin which can be dispersed in an aqueous medium. Examples thereof include; synthetic rubber such as vinyl acetate resins, ethylene vinyl acetate reins, acrylic reins, epoxy resins, polyester resins, polyamide resins, urethane resins, styrene-butadiene resins, acrylonitrile-butadiene resins and acrylic-butadiene resins.

Furthermore, the ink-jet receiving agent of the present invention may contain a well-known water-soluble cationic resin insofar as the effects of the present invention do not deteriorate. Examples of the cationic resin include an epichlorohydrin polyamide resin, an amine epichlorohydrin resin, a polyethyleneimine salt-containing resin, a polyvinylamine salt-containing resin, a polyvinylamidine resin, a polyallylamine salt-containing resin, a polyamine sulfone salt containing resin, a poly(diallyl dimethyl ammonium chloride), dicyandiamide-formalin polycondensate, cationic modified polyvinyl alcohol, a cationic group-containing water-soluble acrylate resin, cationic denatured starch and neutralized salt of chitosan.

The ink-jet receiving agent of the present invention can be manufactured by, for example, mixing the aforementioned cationic polyurethane resin aqueous dispersion, the water-soluble resin (H) and the water-soluble polyvalent metallic salt (J), and other components which can be added if required. In such a manufacturing method, it is convenient to mix the aforementioned cationic polyurethane resin aqueous dispersion with a dispersion or solution, wherein the water-soluble resin (H) and the water-soluble polyvalent metallic salt (J) have been dissolved or dispersed in a suitable aqueous medium, with any of a variety of stirrers and dispersing devices. Furthermore, it is possible to manufacture the agent by adding in an optional order the cationic polyurethane resin aqueous dispersion, the water-soluble resin (H), the water-soluble polyvalent metallic salt (J), and other components, into an aqueous medium while mixing is conducted.

Examples of the stirrer which is usable for mixing the aforementioned cationic polyurethane resin aqueous dispersion, the water-soluble resin (H), the water-soluble polyvalent metallic salt (J) and other components include stirrers which comprise a turbine blade, a propeller blade, a pfaudler impeller, a paddle blade, an anchor blade, a Maxblend blade, a ribbon blade and a dispersion blade. Examples of the dispersing device include various kinds of homogenizers, a bead mill, a sand mill, a line mill, a sonorator and a colloid mill.

Next, the ink-jet recording medium of the present invention is explained below.

The ink-jet recording medium of the present invention can be manufactured by any method. For example, the ink-jet recording medium of the present invention, which is excellent in absorbing property of a pigment ink and waterproof characteristics of a printed image formed thereon, can be manufactured by coating or impregnating the aforementioned ink-jet receiving agent on any of various substrates, and then volatilizing the aqueous medium included in the ink-jet recording medium to form an ink-jet receiving layer on the substrate.

Examples of the substrate usable in the present invention include paper, paperboard, a resin-coated paper, various films, a synthetic paper, fibers, a nonwoven fabric and a spun bond.

A method for coating or impregnating the aforementioned ink-jet receiving agent on a substrate is not limited in particular, and well-known conventional methods can be used.

Examples of the method include a method using a coating device such as an air knife coater, a blade coater, a roll coater, a gravure coater, a comma coater, a gate roll coater, and these methods being convenient.

The ink-jet receiving agent of the present invention hardly generate cracks when it is coated or impregnated on a substrate. Accordingly, it is not necessary to conduct a step for preventing cracks in a film, such as repeating coating plural times or drying an obtained film under low-temperature conditions.

The method for volatilizing the aqueous medium after the ink-jet receiving agent of the present invention is coated on a substrate is not limited in particular, for example, a general method wherein a dryer is used can be used. The drying temperature to volatilize the aqueous medium can be set in the range wherein the aqueous medium can be volatilized but the substrate is not adversely affected by the temperature.

In order to maintain characteristics such as ink absorbing property which satisfies practical use level and good manufacturing efficiency, the ink-jet recording medium of the present invention obtained by the aforementioned manufacturing method preferably comprises an ink-jet receiving layer having a thickness of 3 to 30 μm.

The ink-jet recording medium obtained by the present invention is excellent in ink absorbing property of a pigment ink and waterproof characteristics of a printed image formed thereon, and therefore, it is effectively used as an ink-jet recording medium for a wide format printer.

EXAMPLES

Hereinafter, the present invention is explained concretely using examples. However, the present invention is not limited thereto.

Synthesis Example 1

Synthesis of Tertiary Amino Group-Containing Polyol (E)-I

In a four-necked flask equipped with a thermometer, a stirrer, a reflux condenser and a dropping device, 590 parts by mass of polypropylene glycol-diglycidyl ether (epoxy equivalent: 201 g/eq) was added, and then air in the flask was replaced with nitrogen gas. Subsequently, after it was heated using an oil bath until the temperature in the flask increased to 70° C., 380 parts by mass of di-n-butylamine was added drop-wise over 30 minutes, and after addition was completed, the reaction was conducted for 10 hours at 90° C. Then, after the reaction was completed, it was confirmed that the absorption peak in the vicinity of 842 $cm^{-1}$ had disappeared, wherein the peak represented an epoxy group included in a reaction product, by using an infrared spectrophotometer (FT/IR-460Plus, manufactured by JASCO Corporation), and a tertiary amino group-containing polyol (E)-I (amine equivalent: 339 g/eq, hydroxyl equivalent: 339 g/eq) was prepared.

Synthesis Example 2

Synthesis of Tertiary Amino Group-Containing Polyol (E)-II

A tertiary amino group-containing polyol (E)-II (amine equivalent: 315 g/eq, hydroxyl equivalent: 315 g/eq) was prepared similar to the Synthesis Example 1 except that 543 parts by mass of polyethylene glycol-diglycidyl ether (epoxy equivalent: 185 g/eq) was used instead of the polypropylene glycol-diglycidyl ether (epoxy equivalent: 201 g/eq).

Example 1

In a four-necked flask equipped with a thermometer, a stirrer, a reflux condenser and a dropping device, 705 parts by mass of NIPPOLLAN 980R (polycarbonate polyol obtained by a reaction between 1,6-hexanediol and dimethyl carbonate, manufactured by Nippon Polyurethane Industry Co., Ltd., hydroxyl equivalent: 986 g/eq) and 352 parts by mass of polyester (hydroxyl equivalent: 951 g/eq), which was obtained by reacting neopentyl glycol, 1,4-butanediol, terephthalic acid and adipic acid, were added, and then, dehydration was conducted under the condition of a decompression degree of 0.095 MPa and temperature of 120 to 130° C.

After the dehydration, the mixture was cooled at 70° C., and 666 parts by mass of ethyl acetate was added, and then further stirred sufficiently while cooling to 50° C. After stiffing was completed, 280 parts by mass of 4,4'-dicyclohexylmethane diisocyanate (4,4-H-MDI) and 0.3 parts by mass of stannous octoate were added to the mixture, and reaction was further conducted for two hours at 70° C.

After the reaction was completed, 84 parts by mass of the tertiary amino group-containing polyol (E)-I prepared in the Synthesis Example 1 was added thereto. After the reaction was further conducted for four hours, the mixture was cooled to 55° C. and 47 parts by mass of AMINO SILANE A 1100 (γ-aminopropyltriethoxysilane, manufactured by Nippon Unicar Company Limited) was added thereto, and the reaction was further conducted for one hour to prepare a solution of urethane prepolymer which had a terminal end isocyanate group. Then, 15 parts by mass of hydrazine hydrate was added to the obtained urethane prepolymer solution to conduct a chain extension reaction for one hour.

Subsequently, 1954 parts by mass of ethyl acetate and 16 parts by mass of acetic acid were added to the solution to be maintained at 55° C. for one hour. Then, it was cooled at 40° C. and 3300 parts by mass of ion exchanged water was added thereto to prepare an aqueous dispersion. The aqueous dispersion was distilled under reduced pressure to prepare a cationic polyurethane resin aqueous dispersion (I), wherein the non-volatile content was 35% by mass and pH is 4.1. The pH value is a value obtained by an evaluation conducted with a pH meter (M-12, manufactured by Horiba seisakujyo corporation) under the environment of 25° C. Following pH values were evaluated by the same method.

Example 2

A cationic polyurethane resin aqueous dispersion (II) wherein pH was 4.4 and the non-volatile content was 35% by mass was prepared similar to Example 1, except that 78 parts by mass of the tertiary amino group-containing polyol (E)-II prepared in the Synthesis Example 2 was used instead of the tertiary amino group-containing polyol (E)-1 and 186 parts by mass of tolylene diisocyanate was used instead of the 4,4'-dicyclohexylmethane diisocyanate.

Example 3

A cationic polyurethane resin aqueous dispersion (III) wherein pH was 5.7 and the non-volatile content was 35% by mass was prepared similar to Example 1 except that 31 parts by mass of dimethyl sulfate was used instead of the acetic acid.

Example 4

A cationic polyurethane resin aqueous dispersion (IV) wherein pH was 5.6 and the non-volatile content was 35% by mass was prepared similar to Example 2 except that 31 parts by mass of dimethyl sulfate was used instead of the acetic acid.

Example 5

In a four-necked flask equipped with a thermometer, a stirrer, a reflux condenser and a dropping device, 705 parts by mass of NIPPOLLAN 980R and 352 parts by mass of polyester (hydroxyl equivalent: 951 g/eq) obtained by reacting neopentyl glycol, 1,4-butanediol, terephthalic acid and adipic acid were added, and then, dehydration was conducted under the condition of a decompression degree of 0.095 MPa and at temperature of 120 to 130° C.

Subsequently, the mixture was cooled to 70° C., and then, 295 parts by mass of polypropylene glycol having a molecular weight of 1000 (hydroxyl equivalent: 500 g/eq) and 666 parts by mass of ethyl acetate were added thereto. Furthermore, the mixture was cooled to 50° C. and mixed sufficiently while stirring, and then, 280 g of 4,4'-dicyclohexylmethane diisocyanate and 0.3 parts by mass of stannous octoate were added to the mixture, and reaction was further conducted for two hours at 70° C.

After the reaction was completed, 84 parts by mass of the tertiary amino group-containing polyal (E)-I prepared in the Synthesis Example 1 was added thereto. After the reaction was further conducted for four hours, the mixture was cooled to 55° C., and 47 parts by mass of AMINO SILANE A 1100 was added to the mixture, and the mixture was furthermore allowed to react for one hour. After the reaction was completed, it was confirmed that the absorption peak in the vicinity of 2280 cm$^{-1}$ which represented an isocyanate group in a reaction product had disappeared, by using an infrared spectrophotometer (FT/IR-460Plus, manufactured by JASCO Corporation).

Subsequently, 1954 parts by mass of ethyl acetate and 16 parts by mass of acetic acid were added to the solution, and it was maintained at 55° C. for one hour. Then, it was cooled to 40° C. and 3300 parts by mass of ion-exchanged water was added to prepare an aqueous dispersion. The obtained aqueous dispersion was distilled under reduced pressure to prepare a cationic polyurethane resin aqueous dispersion (V) wherein the non-volatile content was 35% by mass and pH was 4.5.

Example 6

A cationic polyurethane resin aqueous dispersion (VI) wherein pH was 4.4 and the non-volatile content was 35% by mass was prepared similar to Example 5, except that 78 parts by mass of the tertiary amino group-containing polyol (E)-II prepared in the Synthesis Example 2 was used instead of the tertiary amino group-containing polyol (E)-I, and 186 parts by mass of tolylene diisocyanate was used instead of the 4,4'-dicyclohexylmethane diisocyanate.

Example 7

A cationic polyurethane resin aqueous dispersion (VII) wherein pH was 4.5 and the non-volatile content was 35% by mass was prepared similar to Example 1, except that AMINO SILANE A 1100 was not used and the amount of the hydrazine hydrate was changed to 20 parts by mass.

Example 8

A cationic polyurethane resin aqueous dispersion (VIII) wherein pH was 5.7 and the non-volatile content was 35% by mass was prepared similar to Example 1, except that polyester (hydroxyl equivalent: 951 g/eq) obtained by reacting neopentyl glycol, 1,4-butanediol, terephthalic acid and adipic acid was not used, AMINO SILANE A 1100 was not used, the amount of the hydrazine hydrate was changed to 20 parts by mass, and 31 parts by mass of dimethyl sulfate was used instead of acetic acid.

Comparative Example 1

In a four-necked flask equipped with a thermometer, a stirrer, a reflux condenser and a dropping device, 705 parts by mass of NIPPOLLAN 980R and 352 parts by mass of polyester (hydroxyl equivalent: 951 g/eq) obtained by reacting neopentyl glycol, 1,4-butanediol, terephthalic acid and adipic acid, were added, and then, dehydration was conducted under the condition of a decompression degree of 0.095 MPa and at temperature of 120 to 130° C.

Next, the mixture was cooled to 70° C., and 666 parts by mass of ethyl acetate was added thereto and cooled to 50° C. After mixing the mixture sufficiently while stirring, 280 parts by mass of 4,4'-dicyclohexylmethane diisocyanate and 0.3 parts by mass of stannous octoate were added to the mixture, and reaction was further conducted for two hours at 70° C.

After the reaction, 30 parts by mass of N-methyl-diethanolamine was added thereto, and reaction was conducted for four hours to prepare a solution containing a urethane prepolymer having a terminal end isocyanate group. Then, 14 parts by mass of hydrazine hydrate was added to the obtained urethane prepolymer solution which was maintained at 55° C., and then the chain extension reaction was conducted for one hour.

Subsequently, after adding 1954 parts by mass of ethyl acetate and 31 parts by mass of dimethyl sulfate, the mixture was maintained at 55° C. for one hour and then cooled to 40° C., and 3300 parts by mass of ion-exchanged-water was added thereto to prepare an aqueous dispersion. The obtained aqueous dispersion was distilled under reduced pressure to prepare a milky white cationic polyurethane resin aqueous dispersion (IX) wherein the non-volatile content was 35% by mass and pH was 6.5.

Comparative Example 2

A cationic polyurethane resin aqueous dispersion (X) wherein pH was 6.4 and the non-volatile content was 35% by mass was prepared similar to Comparative Example 1, except that 186 parts by mass of tolylene diisocyanate was used instead of the 4,4'-dicyclohexylmethane diisocyanate.

Comparative Example 3

In a four-necked flask equipped with a thermometer, a stirrer, a reflux condenser and a dropping device, 705 parts by mass of NIPPOLLAN 980R and 352 parts by mass of polyester (hydroxyl equivalent: 951 g/eq) obtained by reacting neopentyl glycol, 1,4-butanediol, terephthalic acid and adipic acid, were added, and then dehydration was conducted under the condition of a decompression degree of 0.095 MPa and at temperature of 120 to 130° C.

Subsequently, after the mixture was cooled to 70° C., 274 parts by mass of polypropylene glycol having a molecular weight of 1000 (hydroxyl equivalent: 500 g/eq) and 666 parts by mass of ethyl acetate were added to the mixture, and was cooled to 50° C. and then mixed sufficiently while stiffing. Furthermore, 280 parts by mass of 4,4'-dicyclohexylmethane diisocyanate and 0.3 parts by mass of stannous octoate were added to the mixture, and reaction was further conducted for four hours.

After the reaction was completed, it was confirmed that the absorption peak in the vicinity of 2280 $cm^{-1}$, which represented an isocyanate group in a reaction product, had disappeared with an infrared spectrophotometer (FT/IR-460Plus, manufactured by JASCO Corporation).

Subsequently, 1954 parts by mass of ethyl acetate and 31 parts by mass of dimethyl sulfate were added to the mixture and maintained at 55° C. for one hour. Then, it was cooled at 40° C., and 3300 parts by mass of ion exchanged water was added to prepare an aqueous dispersion. The obtained aqueous dispersion was distilled under reduced pressure to prepare a milky white cationic polyurethane resin aqueous dispersion (XI) wherein the non-volatile content was 35% by mass and pH was 6.6.

Comparative Example 4

A cationic polyurethane resin aqueous dispersion (XII) wherein pH was 5.5 and the non-volatile content was 35% by mass was prepared similar to Comparative Example 3, except that 186 parts by mass of tolylene diisocyanate was used instead of 4,4'-dicyclohexylmethane diisocyanate and 16 parts by mass of acetic acid was used instead of dimethyl sulfate.

Evaluation results of the various physical properties of the cationic polyurethane resin aqueous dispersions of Examples 1 to 8 are shown in Tables 1 and 2. Moreover, evaluation results of the various physical properties of the cationic polyurethane resin aqueous dispersions of Comparative Examples 1 to 4 are shown in Table 3. The various physical properties shown in the Tables are evaluated by the methods shown below.

(Evaluation Method of Appearance)

100 ml beaker was placed on a newspaper in which ten point size types had been printed, and the beaker was filled with the cationic polyurethane resin aqueous dispersion so that the height of the dispersion from the bottom of the beaker to the surface of the dispersion be set to 5 cm. The newspaper under the beaker was observed visually from the surface side of the dispersion, and the appearance of the cationic polyurethane resin aqueous dispersion was evaluated as "transparence", when the types of the newspaper has been clearly recognized. When the types of the newspaper were recognized but the were indistinct, the appearance of the cationic polyurethane resin aqueous dispersion was evaluated as "translucence". When the types of the newspaper were could not be recognized at all, the appearance of the cationic polyurethane resin aqueous dispersion was evaluated as "opaque". When the cationic polyurethane resin aqueous dispersion was precipitated or deposited, it was evaluated as "precipitated".

(Measuring Method of Viscosity)

The viscosity of a cationic polyurethane resin aqueous dispersion was measured under the condition of 25° C. with a viscometer (RB100L, manufactured by Toki Sangyo Co., Ltd., measuring time: 60 seconds, rotor cycle: 60 rpm, rotor No: a preferable one was selected from rotor Nos. 1 to 4 in accordance with the viscosity of an aqueous dispersion to be evaluated). Here, the "measurement impossible" in Table 3 means that cationic polyurethane resin is separated from the aqueous dispersion to be solidified, and therefore, viscosity was not able to be measured.

(Measuring Method of Average Particle Diameter)

Each cationic polyurethane resin aqueous dispersion was diluted using ion exchanged water until a non-volatile content became in the range of about 10 ppm to 1%, and then the average particle diameter of cationic polyurethane resin particles included in the distilled water was evaluated under the condition of 25° C. by using a laser particle analyzer (PAR-III, manufactured by Otsuka electronic Co., Ltd.). "Measurement impossible" shown in Table 3 means that the average particle diameter could not be measured since the cationic polyurethane resin was separated from the aqueous dispersion and solidified.

(Evaluation Method of Dispersion Stability after Storage at 40° C. for Three Months)

100 ml of a cationic polyurethane resin aqueous dispersion was put in a 140 ml glass sample bottle, and sealed with a top, and maintained for three months under the condition of 40° C. After the storage was completed, the viscosity of the cationic polyurethane resin aqueous dispersion and the average particle diameter of the cationic polyurethane resin particles contained in the aqueous dispersion were measured by the same method as those described above. Furthermore, the ratio of a supernatant liquid and whether or not there was a deposit or precipitate were evaluated visually. The ratio of a supernatant liquid was determined as a ratio (%) of the height of the generated supernatant liquid to the height of the aqueous dispersion which was from the bottom of the sample bottle to the liquid surface of the dispersion. Whether or not there was a aggregate or precipitate was evaluated visually, and cases where precipitate and aggregate were observed visually was represented as "X", and a case where precipitate and aggregate were not observed visually was represented as "○".

(Measuring Method of Adhesiveness to an Inorganic Substrate)

Test pieces were prepared such that each cationic polyurethane resin aqueous dispersion immediately after manufacture thereof was coated on each of an aluminum plate, a galvanized steel plate, a stainless plate (SUS304) and a glass plate to have a coated amount of 1 g/100 cm², and they were dried for one day at 25° C., and further dried for five minutes at 150° C. Subsequently, each film of the test pieces was cross-cut into a lattice pattern such that one hundred squares each having a length and width of 2 mm were formed. Then, a cellophane adhesive tape was pasted on each pattern of the test pieces, and then the tape was peeled from the test pieces. The number of remaining squares left on each test piece was counted, and adhesiveness to an inorganic substrate was evaluated in accordance with the number. The adhesiveness $L_1$: a longitudinal length of the test piece after immersion (cm)

$L_2$: a horizontal length of the test piece after immersion (cm)

$$\text{Elution rate(mass \%)} = ((W_4 - W_5)/W_4) \times 100 \quad \text{Formula (2)}$$

$W_4$: mass (g) of the test piece before immersion $W_5$: mass (g) of the test piece measured after dry processing was conducted at 107° C. for one hour subsequent to immersion

TABLE 1

| | | Ex. 1 | Ex. 2 | Ex. 3 | Ex. 4 | Ex. 5 |
|---|---|---|---|---|---|---|
| Cationic polyurethane resin aqueous dispersion | | I | II | III | IV | V |
| Water dispersing property and storage stability | | | | | | |
| Evaluation conducted immediately after manufacture | Appearance | translucent | transparent | translucent | transparent | translucent |
| | Viscosity (mPa · s) | 69 | 80 | 79 | 111 | 48 |
| | Average particle diameter (nm) | 62 | 22 | 65 | 24 | 49 |
| Evaluation conducted after storage for three months at 40° C. | Appearance | translucent | transparent | translucent | transparent | translucent |
| | Viscosity (mPa · s) | 67 | 81 | 69 | 111 | 48 |
| | Average particle diameter (nm) | 63 | 24 | 64 | 24 | 55 |
| | Height of a supernatant liquid (%) | 0 | 0 | 0 | 0 | 0 |
| | Precipitation and aggregate | ○ | ○ | ○ | ○ | ○ |
| Adhesiveness to an inorganic substrate | | | | | | |
| Aluminum plate | | 92/100 | 94/100 | 97/100 | 96/100 | 98/100 |
| Galvanized steel plate | | 99/100 | 97/100 | 100/100 | 99/100 | 96/100 |
| Stainless plate (SUS304) | | 98/100 | 96/100 | 99/100 | 94/100 | 95/100 |
| Glass plate | | 100/100 | 100/100 | 100/100 | 100/100 | 100/100 |
| Waterproof characteristics | | | | | | |
| Coefficient of area expansion (%) | | 6.8 | 3.3 | 3.3 | 6.8 | 10.2 |
| Elution rate (mass %) | | 0.7 | 0.6 | 0.5 | 0.7 | 1.1 | required to a cationic polyurethane resin aqueous dispersion varies in accordance with the use thereof, and it is preferable that the number of remaining squares to the total is 70/100 or more, and more preferably 90/100 or more from the viewpoint of practical use.

(Method for Evaluating Waterproof Characteristics of a Film)

A polypropylene film on which an outer frame with a height of 1 mm was provided was pasted on an A4 size glass substrate, and a cationic polyurethane resin aqueous dispersion was added on the polypropylene film to achieve 6 g/100 cm², and then the dispersion was dried for one day at 25° C. to form a film having a thickness of about 200 μm. Subsequently, the film was peeled off from the polypropylene film, and the film was cut to form a test sample having a length of 3 cm and width of 3 cm.

After the test piece was immersed in warm water at 40° C. for 24 hours, the size of the sample was measured. Using the size of the sample piece before and after the immersion, the coefficient of area expansion of the test piece was obtained by the calculation according to following formula (1).

Furthermore, after the sample piece after the immersion was dried under the condition of 108° C. for one hour, the mass of the test piece was measured. Using the measured mass of the test piece, an elution rate of the test piece was obtained by the calculation according to the following formula (2).

$$\text{Coefficient of area expansion(\%)} = (L_1 \times L_2/9.0 \text{ cm}^2) \times 100 - 100 \quad \text{Formula (1)}$$

TABLE 2

| | | Ex. 6 | Ex. 7 | Ex. 8 |
|---|---|---|---|---|
| Cationic polyurethane resin aqueous dispersion | | VI | VII | VIII |
| Water dispersing property and storage stability | | | | |
| Evaluation conducted immediately after manufacture | Appearance | transparent | translucent | translucent |
| | Viscosity (mPa · s) | 77 | 60 | 45 |
| | Average particle diameter (nm) | 26 | 60 | 35 |
| Evaluation conducted after storage for three months at 40° C. | Appearance | transparent | translucent | translucent |
| | Viscosity (mPa · s) | 72 | 71 | 41 |
| | Average particle diameter (nm) | 24 | 66 | 43 |
| | Height of a supernatant liquid (%) | 0 | 0 | 0 |
| | Precipitation and aggregate | ○ | ○ | ○ |
| Adhesiveness to an inorganic substrate | | | | |
| Aluminum plate | | 95/100 | 71/100 | 69/100 |
| Galvanized steel plate | | 100/100 | 79/100 | 80/100 |
| Stainless plate (SUS304) | | 99/100 | 76/100 | 79/100 |
| Glass plate | | 100/100 | 80/100 | 82/100 |
| Waterproof characteristics | | | | |
| Coefficient of area expansion (%) | | 10.2 | 10.2 | 1.1 |
| Elution rate (mass %) | | 0.9 | 0.6 | 0.2 |

TABLE 3

|  | Com. Ex. 1 | Com. Ex. 2 | Com. Ex. 3 | Com. Ex. 4 |
|---|---|---|---|---|
| Cationic polyurethane resin aqueous dispersion | IX | X | XI | XII |
| Water dispersing property and storage stability | | | | |
| Evaluation conducted immediately after manufacture — Appearance | opaque (milky white) | opaque (milky white) | opaque (milky white) | opaque (milky white) |
| Viscosity (mPa·s) | 77 | 101 | 74 | 68 |
| Average particle diameter (nm) | 192 | 235 | 188 | 342 |
| Evaluation conducted after storage for three months at 40° C. — Appearance | precipitated | precipitated | precipitated | precipitated |
| Viscosity (mPa·s) | 210 | 310 | 292 | measurement impossible |
| Average particle diameter (nm) | 262 | 349 | 499 | measurement impossible |
| Height of a supernatant liquid (%) | 15 | 14 | 20 | 47 |
| Precipitation and aggregate | X | X | X | X |
| Adhesiveness to an inorganic substrate | | | | |
| Aluminum plate | 45/100 | 52/100 | 39/100 | 40/100 |
| Galvanized steel plate | 44/100 | 51/100 | 44/100 | 41/100 |
| Stainless plate (SUS304) | 48/100 | 49/100 | 45/100 | 47/100 |
| Glass plate | 55/100 | 50/100 | 52/100 | 52/100 |
| Waterproof characteristics | | | | |
| Coefficient of area expansion (%) | 17.3 | 21.0 | 17.3 | 24.7 |
| Elution rate (mass %) | 3.6 | 4.4 | 4.7 | 10.2 |

Hereinafter, Examples and Comparative Examples of an ink-jet receiving agent are described.

Example 9

Preparation of a Cationic Polyurethane Resin Aqueous Dispersion (XIII)

In a four-necked flask equipped with a thermometer, a stirrer, a reflux condenser and a dropping device, 863 parts by mass of NIPPOLLAN 980R was dissolved in 260 parts by mass of methyl ethyl ketone.

Subsequently, 176 parts by mass of 4,4'-dicyclohexylmethane diisocyanate and 0.2 parts by mass of stannous octoate were added thereto, and reaction was conducted for two hours at 75° C. Then, 161 parts by mass of the tertiary amino group-containing polyal (E)-I obtained in Example 1 and 540 parts by mass of methyl ethyl ketone were further added thereto, and reaction was conducted for 15 hours. Then, the solution was cooled to 60° C., and 1.3 parts by mass of methanol was added and reaction was conducted for one hour.

Subsequently, 58 parts by mass of dimethyl sulfate was added to the solution, and maintained at 60° C. for three hours. Furthermore, 400 parts by mass of methyl ethyl ketone, 600 parts by mass of isopropanol and 2942 parts by mass of ion-exchanged water were added thereto and mixed sufficiently to prepare an aqueous dispersion. The obtained aqueous dispersion was distilled under reduced pressure to prepare a cationic polyurethane resin aqueous dispersion (XIII) wherein the non-volatile content was 40% by mass and pH was 6.6.

Example 10

The aforementioned cationic polyurethane resin aqueous dispersion (XIII), an 8% by mass aqueous solution of PVA 145H (manufactured by Kuraray Co., Ltd., polyvinyl alcohol wherein the saponification degree is 99.5% and polymerization degree is 4500) and a 53.5% by mass aqueous solution of hexahydrate of magnesium chloride were mixed such that the mass ratio thereof (the aqueous dispersion (XIII):the 8% by mass aqueous solution of PVA 145H:the 53.5% by mass aqueous solution of hexahydrate of magnesium chloride) became 28.6:66.7:4.7, and stirred sufficiently with a stirrer equipped with propeller wings to prepare an ink-jet receiving agent wherein the non-volatile content was 10.9% by mass.

The obtained ink-jet receiving agent was coated on a transparent film of polyethylene terephthalate (A-4100, manufactured by Toyobo Co., Ltd.), wherein adhesion promoted treatment was conducted, with a No. 60 wire bar, and it was dried for 4 minutes at 120° C. to produce an ink-jet recording medium which had an ink-jet receiving layer having a thickness of 12 μm.

Example 11

An ink-jet receiving agent wherein the non-volatile content was 10.9% by mass was prepared similar to Example 10, except that an 8% by mass aqueous solution of PVA145 (manufactured by Kuraray Co., Ltd., polyvinyl alcohol wherein the saponification degrees is 98.5% and polymerization degree is 4500) was used instead of the 8% by mass aqueous solution of PVA145H.

Similar to the method of Example 10, the obtained ink-jet receiving agent was coated on a transparent film of polyethylene terephthalate (A-4100, manufactured by Toyobo Co., Ltd.), wherein adhesion promoted treatment was conducted, and dried to produce an ink-jet recording medium which had an ink-jet receiving layer having a thickness of 12 μm.

Example 12

The aforementioned cationic polyurethane resin aqueous dispersion (XIII), an 8% by mass aqueous solution of PVA 145H, VIVIPRINT131 (manufactured by ISP Investment, Incorporated, a 11% by mass aqueous solution of modified polyvinyl pyrrolidone containing tertiary amine salt), and a 53.5% by mass aqueous solution of hexahydrate of magnesium chloride were mixed such that the mass ratio thereof (the aqueous dispersion (XIII):the 8% by mass aqueous solution of PVA 145H:VIVIPRINT131:the 53.5% by mass aqueous solution of hexahydrate of magnesium chloride) became 28.6:33.4:33.4:4.6 and stirred sufficiently with a stirrer equipped with propeller wings to prepare an ink-jet receiving agent wherein non-volatile contents was 12.0% by mass.

Similar to the method of Example 10, the obtained ink-jet receiving agent was coated on a transparent film of polyethylene terephthalate (A-4100, manufactured by Toyobo Co., Ltd.), wherein adhesion promoted treatment was conducted, and dried to produce an ink-jet recording medium which had an ink-jet receiving layer having a thickness of 12 μm.

Comparative Example 5

An ink-jet receiving agent was prepared similar to the method of Example 10 except that the 53.5% by mass aqueous solution of hexahydrate of magnesium chloride was not used and the mass ratio (the aqueous dispersion (XIII):the 8% by mass aqueous solution of PVA 145H) was changed to 70:30. Moreover, the ink-jet recording medium was produced using the obtained ink-jet receiving agent by the same method as that of Example 10.

Comparative Example 6

An ink-jet receiving agent was prepared similar to the method of Example 10, except that a 52% by mass aqueous solution of poly diallyldimethyl ammonium chloride which was a water-soluble cationic resin (hereinafter, abbreviated to DADMAC) was used instead of the cationic polyurethane resin aqueous dispersion (XIII) and the mass ratio (the 52% by mass aqueous solution of DADMAC:the 8% by mass aqueous solution of PVA 145H:the 53.5% by mass aqueous solution of hexahydrate of magnesium chloride) was changed to 9.5:85.7:4.8. Moreover, an ink-jet recording medium was produced using the obtained ink-jet receiving agent by the same method as that of Example 10.

Comparative Example 7

An ink-jet receiving agent was prepared similar to the method of Example 10, except that a cationic polyurethane resin aqueous dispersion (XIII) was not used, and the mass ratio (the 8% by mass aqueous solution of PVA 145H: the 53.5% by mass aqueous solution of hexahydrate of magnesium chloride) was changed to 95:5. Subsequently, an ink-jet recording medium was produced using the obtained ink-jet receiving agent by the same method as that of Example 10.

Comparative Example 8

The aforementioned cationic polyurethane resin aqueous dispersion (IX), an 8% by mass aqueous solution of PVA 145H, VIVIPRINT131 (manufactured by ISP Investment, Incorporated, a 11% by mass aqueous solution of modified polyvinyl pyrrolidone containing tertiary amine salt), and a 53.5% by mass aqueous solution of hexahydrate of magnesium chloride were mixed such that the mass ratio thereof (the aqueous dispersion (IX):the 8% by mass aqueous solution of PVA 145H:VIVIPRINT131:the 53.5% by mass aqueous solution of hexahydrate of magnesium chloride) satisfied 28.6:33.4:33.4:4.6 and stirred sufficiently with a stirrer equipped with propeller wings to prepare an ink-jet receiving agent wherein the non-volatile content was 12.0% by mass.

Similar to the method of Example 10, the obtained ink-jet receiving agent was coated on a transparent film of polyethylene terephthalate (A-4100, manufactured by Toyobo Co., Ltd.), wherein adhesion promoted treatment was conducted, and dried to produce an ink-jet recording medium which had an ink-jet receiving layer having a thickness of 12 μm.

(Evaluation Method of Printing Property Regarding Pigment Ink)

Using pigment inks, 100% solid images of each color, that is, Cyan (hereinafter, abbreviate to "C"), Magenta (hereinafter, abbreviate to "M"), Yellow (hereinafter, abbreviate to "Y") and Black (hereinafter, abbreviate to "Bk") were formed on the obtained ink-jet recording media with a wide-format ink-jet printer (DJ-3800CP, manufactured by Hewlett-Packard Company). Color optical density of each 100% solid image of C, M, Y, or Bk printed on each ink-jet recording medium was measured with a reflection color densitometer (D186, manufactured by Gretag Corporation).

(Evaluation Method of Pigment Ink Absorbing Property)

Using pigment inks, 100% Y solid images were formed on the ink-jet recording medium with the wide format ink-jet printer (DJ-3800CP, manufactured by Hewlett-Packard Company). Furthermore, by putting solid images on the 100% Y solid image, a 400% solid image wherein each 100% solid image of C, M, Y and Bk was printed on the medium in total was obtained using pigment inks. Evaluations were conducted such that the degree of the ink absorption, whether or not cracks were produced, and whether or not bleeding was caused were observed visually, at the portion where the 400% solid image was formed.

The degree of the ink absorption was determined such that it was determined as "good" when the hue of the 400% solid image was almost equal in total, and it was determined as "poor" when the hue of the 400% solid image was not equal partially. Whether or not cracks were produced was determined such that it was determined as "not existing" when no crack was produced in a printed 400% solid image, and it was determined as "existing" when cracks were produced.

Furthermore, it was evaluated as "occurred" when bleeding was produced at the outline of the 400% solid image, and evaluated as "not occurred" when bleeding was not produced at the outline of the 400% solid image.

(Evaluation Method of Waterproof Characteristics of a Printed Image)

Each of the ink-jet recording medium used in the aforementioned evaluation of printing property regarding pigment ink, on which the solid image was formed thereon, was immersed in water at 25° C. for one hour, and then dried for one day under ordinary temperature and humidity. Then, color optical density of each 100% solid image of C, M, Y and Bk of the dried ink-jet recording medium was measured with a reflection color densitometer (D186, manufactured by Gretag Corporation) and the color optical density retention rate was calculated by the following formula (3) using the color optical densities before and after the immersion. As an index, it can be understood that a waterproof degree sufficient for practical use can be achieved when 90% or more of the color optical density retention rate can be achieved. In addition, a case wherein an ink-jet receiving layer was dissolved in water when each ink-jet recording medium was immersed in water was represented as "measurement impossible".

Color optical density retention rate(%)=((color density after immersion)/(color density before immersion))×100      Formula (3)

(Evaluation Method of Printing Property Regarding Dye Ink)

Using dye inks, 100% solid images of each color of C, M, Y and Bk were formed on the obtained ink-jet recording media with the wide format ink-jet printer (DJ-3800CP, manufactured by Hewlett-Packard Company). The color optical density of each 100% solid image of C, M, Y, or Bk printed on each ink-jet recording medium was measured with the reflection color densitometer (D186, manufactured by Gretag Corporation).

(Evaluation Method of Dye Ink Absorbing Property)

Using dye inks, a 100% Y solid image was formed on the ink-jet recording medium with the wide format ink-jet printer (DJ-3800CP, manufactured by Hewlett-Packard Company). Furthermore, by putting solid images on the 100% Y solid image, a 400% solid image wherein each 100% solid image of C, M, Y and Bk was printed on the medium in total was obtained using dye inks. Evaluations were conducted such that the degree of the ink absorption, whether or not cracks were produced, and whether or not bleeding was caused were observed visually.

The degree of the ink absorption was determined such that it was determined as "good" when the hue of the 400% solid image was almost equal in total, and it was determined as "poor" when the hue of the 400% solid image was not equal partially. Whether or not cracks were produced was determined such that it was determined as "not occurred" when no crack was produced in a printed 400% solid image, and it was determined as "occurred" when cracks were produced.

Furthermore, it was evaluated as "occurred" when bleeding was produced at the outline of the 400% solid image, and it was evaluated as "not occurred" when bleeding was not produced at the outline of the 400% solid image.

(Evaluation Method of a Post-Cure)

Heat-treatment of each ink-jet recording medium was conducted at 160° C. for 5 minutes. Subsequently, each 100% solid image of C, M, Y and Bk was printed on the heat-treated ink-jet recording medium and a non-heat-treated ink-jet recording medium with a ink-jet printer (DJ-990CXI, manufactured by Hewlett-Packard Company). Evaluation of post-cure was conducted such that when there was no substantial difference between the hue of the 100% solid image printed on the heat treated ink-jet recording medium and the hue of the 100% solid image printed on the non-heat treated ink-jet recording medium, it was evaluated as "not occurred", and when the hue of the 100% solid image printed on the heat treated ink-jet recording medium was not clear compared with the hue of the 100% solid image printed on the non-heat treated ink-jet recording medium, it was evaluated as "occurred".

The evaluation method was an accelerating test conducted based on the assumption that an ink-jet recording medium preserved for a long-term period might be printed. "Not occurred" described in the evaluation of post-cure means that an excellent ink-jet recording medium can be obtained.

TABLE 4

| | | | Ex. 10 | Ex. 11 | Ex. 12 |
|---|---|---|---|---|---|
| Cationic polyurethane resin aqueous dispersion | | | Aqueous dispersion (XIII) | Aqueous dispersion (XIII) | Aqueous dispersion (XIII) |
| Solution of water-soluble resin | | | 8% by mass aqueous solution of PVA 145H | 8% by mass aqueous solution of PVA 145 | 8% by mass aqueous solution of PVA 145H/VIVIPRINT131 |
| Solution of water-soluble polyvalent metal salt | | | 53.5% by mass aqueous solution of hexahydrate of magnesium chloride | 53.5% by mass aqueous solution of hexahydrate of magnesium chloride | 53.5% by mass aqueous solution of hexahydrate of magnesium chloride |
| Printing property regarding pigment ink | Color optical density | C | 1.67 | 1.58 | 1.98 |
| | | M | 1.45 | 1.3 | 1.4 |
| | | Y | 1.39 | 1.33 | 1.42 |
| | | Bk | 2.93 | 2.04 | 3.02 |
| Pigment ink absorbing property | Ink absorption | | Good | Good | Good |
| | Crack | | Not occurred | Not occurred | Not occurred |
| | Bleeding | | Not occurred | Not occurred | Not occurred |
| Waterproof characteristics of printed image | Color optical density retention rate (%) | C | 100 | 93.1 | 95.2 |
| | | M | 94.5 | 100 | 92.9 |
| | | Y | 99.3 | 95.2 | 100 |
| | | Bk | 96.7 | 92.1 | 96.4 |
| Printing property regarding dye ink | Color optical density | C | 1.47 | 1.43 | 1.43 |
| | | M | 2.21 | 2.14 | 2.18 |
| | | Y | 1.71 | 1.71 | 1.65 |
| | | Bk | 2.14 | 2.29 | 2.24 |
| Dye ink absorbing property | Degree of the ink absorption | | Good | Good | Good |
| | Bleeding | | Not occurred | Not occurred | Not occurred |
| | Post-cure | | Occurred | Occurred | Not occurred |

In the Table 4, "PVA 145H" represents a polyvinyl alcohol wherein the saponification degree is 99.5% and polymerization degree is 4500 manufactured by Kuraray Co., Ltd. "PVA145" represents polyvinyl alcohol wherein the saponification degree is 98.5% and polymerization degree is 4500 manufactured by Kuraray Co., Ltd. "VIVIPRINT131" represents an 11% by mass aqueous solution of modified polyvinyl pyrrolidone containing a tertiary amine salt, manufactured by ISP Investment, Incorporated.

TABLE 5

|  |  |  | Com. Ex. 5 | Com. Ex. 6 | Com. Ex. 7 | Com. Ex. 8 |
|---|---|---|---|---|---|---|
| Cationic polyurethane resin aqueous |  |  | Aqueous dispersion (XIII) | — | — | Aqueous dispersion (IX) |
| Solution of water-soluble resin |  |  | 8% by mass aqueous solution of PVA 145H | 8% by mass aqueous solution of PVA 145H/52% by mass aqueous solution of DADMAC | 8% by mass aqueous solution of PVA 145H | 8% by mass aqueous solution of PVA 145H/VIVIPRINT131 |
| Solution of water-soluble polyvalent metal salt |  |  | — | 53.5% by mass aqueous solution of hexahydrate of magnesium chloride | 53.5% by mass aqueous solution of hexahydrate of magnesium chloride | 53.5% by mass aqueous solution of hexahydrate of magnesium chloride |
| Printing property regarding pigment ink | Color optical density | C | 1.43 | 1.35 | 1.64 | 1.55 |
|  |  | M | 1.43 | 1.32 | 1.44 | 1.37 |
|  |  | Y | 1.5 | 1.22 | 1.52 | 1.34 |
|  |  | Bk | 3.08 | 2.18 | 3 | 2.94 |
| Pigment ink absorbing property | Ink absorption |  | Poor | Good | Good | Good |
|  | Crack |  | Not occurred | Occurred | Not occurred | Not occurred |
|  | Bleeding |  | Occurred | Not occurred | Not occurred | Not occurred |
| Waterproof characteristics of printed image | Color optical density retention rate (%) | C | measurement impossible | measurement impossible | measurement impossible | 88.4 |
|  |  | M | measurement impossible | measurement impossible | measurement impossible | 89.1 |
|  |  | Y | measurement impossible | measurement impossible | measurement impossible | 95.5 |
|  |  | Bk | measurement impossible | measurement impossible | measurement impossible | 59.2 |
| Printing property regarding dye ink | Color optical density | C | 1.42 | 1.4 | 1.41 | 1.12 |
|  |  | M | 2.16 | 2.15 | 2.21 | 1.99 |
|  |  | Y | 1.66 | 1.65 | 1.42 | 1.63 |
|  |  | Bk | 1.89 | 1.94 | 2.18 | 2.23 |
| Dye ink absorbing property | Degree of ink absorption |  | Good | Good | Good | Good |
|  | Bleeding |  | Not occurred | Not occurred | Not occurred | Not occurred |
|  | Post-cure |  | Occurred | Occurred | Occurred | Not occurred |

In the Table 5, "PVA 145H" represents a polyvinyl alcohol wherein the saponification degree is 99.5% and polymerization degree is 4500 manufactured by Kuraray Co., Ltd. "VIVIPRINT131" represents an 11% by mass aqueous solution of modified polyvinyl pyrrolidone containing an tertiary amine salt, manufactured by ISP Investment, Incorporated. DADMAC represents poly diallyldimethyl ammonium chloride.

INDUSTRIAL APPLICABILITY

The cationic polyurethane resin aqueous dispersion of the present invention has the aforementioned excellent characteristics, and therefore, in addition to use for ink-jet media, it can be used for various uses for heat-transfer media, heat-sensitive media, heat-sensitive stencil printing plate media, coatings, adhesives, cosmetics, plating, fibers, toiletries, medical articles, packing articles and the like.

The invention claimed is:

1. An ink-jet receiving agent, which comprises:
a cationic polyurethane resin (B) containing a structural unit (A) represented by general formula (I):

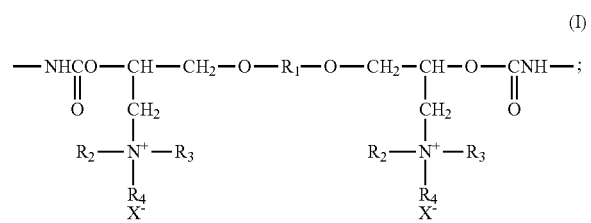

(I)

a water-soluble resin (H);
water-soluble polyvalent metallic salt (J); and
an aqueous medium into which said resins and salt are dispersed,
wherein
the content of a cationic amino group of the structural unit (A) included in the cationic polyurethane resin (B) is 0.005 to 1.5 equivalents/kg
and wherein in the formula (I),
$R_1$ represents an alkylene group, an alkylene group which includes an alicyclic structure, a residue of bivalent phenol, or polyoxyalkylene group,
$R_2$ and $R_3$ each independently represents an alkyl group, or an alkyl group which includes an alicyclic structure, and
$R_4$ represents a hydrogen atom or a residue of the quaternizing agent which is introduced by a quaternizing reaction, and
$X^-$ represents an anionic counter ion.

2. The ink-jet receiving agent according to claim 1, wherein the cationic polyurethane resin (B) comprises structural units originated from polyol, which is obtained by an esterification reaction between carbonic acid and aliphatic polyhydric alcohol.

3. The ink-jet receiving agent according to claim 1, wherein the cationic polyurethane resin (B) comprises structural units originated from alicyclic polyisocyanate and/or aliphatic polyisocyanates.

4. The ink-jet receiving agent according to claim 1, wherein the water-soluble resin (H) is at least one resin selected from the group consisting of polyvinyl alcohol, polyvinyl pyrrolidone, polyvinyl acetal, polyalkylene oxide and cellulose derivatives.

5. The ink-jet receiving agent according to claim 1, wherein the water-soluble resin (H) is polyvinyl alcohol.

6. The ink-jet receiving agent according to claim 5, wherein the saponification degree of the polyvinyl alcohol is 95% or more.

7. The ink-jet receiving agent according to claim 5, wherein the saponification degree of the polyvinyl alcohol is 98% or more.

8. The ink-jet receiving agent according to claim 1, wherein the water-soluble resin (H) is a mixture of polyvinyl alcohol and polyvinyl pyrrolidone.

9. The ink-jet receiving agent according to claim 1, wherein the water-soluble resin (H) is a mixture of polyvinyl alcohol and modified polyvinyl pyrrolidone comprising a tertiary amine salt.

10. The ink-jet receiving agent according to claim 9, wherein the saponification degree of the polyvinyl alcohol is 95% or more.

11. The ink-jet receiving agent according to claim 9, wherein the saponification degree of the polyvinyl alcohol is 98% or more.

12. The ink-jet receiving agent according to claim 1, wherein the water-soluble polyvalent metallic salt (J) is a water-soluble magnesium salt.

13. The ink-jet receiving agent according to claim 1, wherein the water-soluble polyvalent metallic salt (J) is magnesium chloride.

14. A forming method of an ink-jet recording medium, which comprises a substrate and an ink-jet receiving layer formed on the substrate; comprising
coating a substrate with, or impregnating a substrate into, the ink-jet receiving agent according to claim 1; and
volatilizing the aqueous medium from the coated or impregnated ink-jet receiving agent to form an ink-jet receiving layer formed on the substrate, wherein the ink-jet receiving layer comprises the cationic polyurethane resin (B) containing the structural unit (A), the water-soluble resin (H) and the water-soluble polyvalent metallic salt (J).

15. An ink-jet recording medium obtained by the forming method according to claim 14, wherein
the ink-jet recording medium comprises a substrate and an ink-jet receiving layer formed on the substrate, wherein the ink-jet receiving layer comprises the cationic polyurethane resin (B) containing the structural unit (A), the water-soluble resin (H) and the water-soluble polyvalent metallic salt (J).

* * * * *